(12) United States Patent
Ochiai et al.

(10) Patent No.: US 7,635,512 B2
(45) Date of Patent: Dec. 22, 2009

(54) NICKEL ELECTRODE MATERIAL, AND PRODUCTION METHOD THEREFOR, AND NICKEL ELECTRODE AND ALKALINE BATTERY

(75) Inventors: Seijiro Ochiai, Osaka (JP); Mitsuhiro Kodama, Osaka (JP); Kengo Furukawa, Osaka (JP); Toshiki Tanaka, Osaka (JP); Minoru Kuzuhara, Osaka (JP); Masaharu Watada, Osaka (JP); Masahiko Oshitani, Osaka (JP)

(73) Assignee: Yuasa Corporation, Takatsuki-shi, Osaka (JP)

( * ) Notice: Subject to any disclaimer, the term of this patent is extended or adjusted under 35 U.S.C. 154(b) by 663 days.

(21) Appl. No.: 10/486,906

(22) PCT Filed: Sep. 3, 2002

(86) PCT No.: PCT/JP02/08919

§ 371 (c)(1), (2), (4) Date: Feb. 17, 2004

(87) PCT Pub. No.: WO03/021698

PCT Pub. Date: Mar. 13, 2003

(65) Prior Publication Data

US 2004/0241545 A1 Dec. 2, 2004

(30) Foreign Application Priority Data

| | | | |
|---|---|---|---|
| Sep. 3, 2001 | (JP) | | 2001-265607 |
| Sep. 4, 2001 | (JP) | | 2001-267354 |
| Oct. 9, 2001 | (JP) | | 2001-311218 |
| Nov. 14, 2001 | (JP) | | 2001-348245 |

(51) Int. Cl.
   *B32B 3/04* (2006.01)
   *H01M 4/00* (2006.01)
(52) U.S. Cl. .................. 428/128; 429/223; 429/128

(58) Field of Classification Search ................. 429/223, 429/128; 428/128
See application file for complete search history.

(56) References Cited

U.S. PATENT DOCUMENTS 3,311,502 A * 3/1967 Dryden ....................... 429/223

(Continued)

FOREIGN PATENT DOCUMENTS

EP 926 750 A1 11/1998

(Continued)

OTHER PUBLICATIONS

European Search Report Dated Sep. 4, 2006.

(Continued)

*Primary Examiner*—Patrick Ryan
*Assistant Examiner*—Helen O Chu
(74) *Attorney, Agent, or Firm*—McGinn IP Law Group, PLLC

(57) ABSTRACT

For accomplishing the subjects, the invention provides a nickel electrode material for use in a nickel electrode, wherein the positive-electrode material constituting the electrode material comprises: positive active material particles which comprise as the main component either a nickel hydroxide or a solid solution in a nickel hydroxide of one or more other elements and in which part of the nickel hydroxide has been oxidized; and a coating layer formed on the surface of the positive active material particles and comprising as the main component a high-order cobalt compound in which the cobalt has an oxidation number larger than 2, the average oxidation number of the nickel in the positive active material particles and the cobalt in the coating layer being from 2.04 to 2.40, and the positive-electrode material having a tap density of 2.0 g/cm$^3$ or higher. The invention further provides a process for producing the electrode material, a nickel electrode employing the electrode material, and an alkaline storage battery having the nickel electrode.

23 Claims, 4 Drawing Sheets

U.S. PATENT DOCUMENTS

| | | | |
|---|---|---|---|
| 3,625,770 A * | 12/1971 | Arrance et al. | 429/136 |
| 5,489,314 A * | 2/1996 | Bogauchi et al. | 29/623.5 |
| 5,840,269 A | 11/1998 | Shin et al. | |
| 6,183,909 B1 * | 2/2001 | Maeda et al. | 429/223 |
| 6,203,945 B1 | 3/2001 | Baba et al. | |
| 6,251,538 B1 * | 6/2001 | Seyama et al. | 429/223 |
| 6,576,368 B1 * | 6/2003 | Ogasawara et al. | 429/223 |
| 2001/0008729 A1 | 7/2001 | Ogasawara et al. | |
| 2002/0098415 A1 * | 7/2002 | Sakamoto et al. | 429/223 |

FOREIGN PATENT DOCUMENTS

| | | |
|---|---|---|
| EP | 0 889 535 A2 | 1/1999 |
| JP | 3-78965 | 4/1991 |
| JP | 07-094182 | 4/1995 |
| JP | 9-223500 | 8/1997 |
| JP | 09-223500 | 8/1997 |
| JP | 10-012237 | 1/1998 |
| JP | 10-021901 | 1/1998 |
| JP | 10-74512 | 3/1998 |
| JP | 10-125315 | 5/1998 |
| JP | 10-149821 * | 6/1998 |
| JP | 11-149924 * | 6/1998 |
| JP | 10-188970 | 7/1998 |
| JP | 10-261412 | 9/1998 |
| JP | 11-007950 | 1/1999 |
| JP | 11-025967 | 1/1999 |
| JP | 11-144723 | 5/1999 |
| JP | 11-185749 | 7/1999 |
| JP | 2000-77070 | 3/2000 |
| JP | 2000-173614 | 6/2000 |
| JP | 2000-223119 | 8/2000 |
| JP | 2001-93526 | 4/2001 |

OTHER PUBLICATIONS

Notification of Reasons for Refusal dated Jun. 30, 2009 with an English translation.

* cited by examiner

NICKEL ELECTRODE MATERIAL, AND PRODUCTION METHOD THEREFOR, AND NICKEL ELECTRODE AND ALKALINE BATTERY

TECHNICAL FIELD

The present invention relates to a nickel electrode material for use in alkaline storage batteries and a process for producing the electrode material. The invention further relates to a nickel electrode employing the electrode material and an alkaline storage battery having this nickel electrode.

BACKGROUND ART

"Background Art 1"

With the rapid spread of portable appliances in recent years, small high-performance storage batteries have come to be strongly desired. In alkaline storage batteries represented by nickel/metal-hydride storage batteries, nickel-cadmium storage batteries, nickel-zinc storage batteries, and the like, a further increase in capacity and a further reduction in size are expected.

Incidentally, many techniques for improving a positive active material so as to attain a capacity increase in alkaline storage batteries have been proposed, for example, as shown below.

(1) In JP-B-7-77129, the pore volume of positive active material particles comprising nickel hydroxide is reduced to thereby heighten the density of the positive active material particles and thus attain an increased battery capacity.

(2) In JP-A-61-138458, a cobalt compound generating a bivalent cobalt ion in an alkaline electrolytic solution is added to and mixed with positive active material particles comprising nickel hydroxide. According to this technique, the cobalt compound first dissolves in an alkaline electrolytic solution and thereafter reprecipitates as cobalt hydroxide, upon which reprecipitation the cobalt compound forms a network connecting the positive active material particles and the current collector to one another. This network changes into a satisfactory conductive network when the cobalt hydroxide is oxidized into a highly conductive cobalt compound in the first charge of the battery. Consequently, the coefficient of use of the active material is improved.

(3) In JP-A-63-152866 and JP-B-4-4698, positive active material particles comprising nickel hydroxide are coated with cobalt hydroxide beforehand. According to this technique, a satisfactory conductive network is formed by the first charge of the battery to attain an improved coefficient of use of the active material, as in the technique (2) described above. In addition, a cost reduction due to the reduced cobalt amount and an increase in energy density can be attained.

However, since the oxidation of the cobalt hydroxide by the first charge is an irreversible reaction, the cobalt hydroxide oxidized is not reduced during discharge. Because of this, the negative electrode has electricity remaining undischarged. The quantity of this electricity is referred to as "discharge reserve". In nickel/metal-hydride storage batteries, a discharge reserve generates also upon corrosion of the negative-electrode alloy. Furthermore, a discharge reserve generates depending on the quantity of irreversible electricity in the oxidation/reduction of the nickel hydroxide.

When a discharge reserve generates, the uncharged capacity of the negative electrode at the final stage of charge (referred to as "charge reserve") is reduced and this accelerates hydrogen gas evolution at the negative electrode to elevate the internal pressure of the battery. When the internal pressure increases, the safety vent works to release the gas. Because of this, the water constituting the electrolytic solution disappears and the battery comes to be deficient in electrolytic solution and have reduced performance. The battery life is thus shortened.

Furthermore, in nickel/metal-hydride storage batteries, the negative electrode is made to have a discharge reserve and a charge reserve by regulating the capacity of the negative electrode so as to be larger than that of the positive electrode. The discharge capacity of the battery is hence usually controlled by the positive electrode. Because of this, when an increase in battery capacity is attempted by increasing the capacity of the positive electrode, the capacity of the negative electrode also should be increased, making it impossible to attain a size reduction. If the generation of a discharge reserve can be inhibited, the amount of the negative active material to be used for impregnation can hence be reduced accordingly to attain a size reduction or the amount of the positive active material to be used for impregnation can be increased to attain a capacity increase.

Consequently, techniques for reducing a discharge reserve have been proposed in order to attain a higher performance by inhibiting the internal-pressure increase during charge or improving cycle life characteristics and to attain a size reduction and a capacity increase. For example, (4) in JP-A-3-78965, JP-A-8-148145, and JP-A-8-213010, a high-order cobalt compound in which the cobalt has an oxidation number larger than 2 is disposed beforehand on the surface of positive active material particles comprising nickel hydroxide. According to this technique, the irreversible reaction in which cobalt hydroxide is oxidized by first charge is inhibited and, hence, a reduced discharge reserve is attained. However, this technique is insufficient because the irreversible capacity of cobalt hydroxide is not the only cause of discharge reserve generation.

Furthermore, the following has been proposed as a technique for attaining a reduced discharge reserve. Namely, (5) in JP-A-2000-223119, an attempt has been made in which a high-order cobalt compound is deposited on the surface of positive active material particles comprising nickel hydroxide and an oxidation treatment with an oxidizing agent is conducted in an aqueous alkali solution to partly oxidize the nickel hydroxide.

However, when the oxidation treatment disclosed in the patent document cited in (5) above is conducted in a high-concentration aqueous alkali solution at a high temperature, part of the nickel hydroxide is oxidized to γ-NiOOH and the tap density of the positive active material particles decreases. There is hence a problem that the decrease in tap density is contrary to the desired density increase in positive active material particles and this in turn is contrary to the desired capacity increase (first problem).

It was found that a technique effective in eliminating the first problem is to first conduct an oxidation treatment in an aqueous alkali solution of 20% by weight or lower containing an oxidizing agent under the conditions of 60° C. or lower, thereafter add an aqueous alkali solution of 30% by weight or higher, and conduct a heat treatment under the conditions of 80° C. or higher. It should, however, be noted that in case where the heat treatment is conducted for too long a time period or at too high a temperature, the following problem newly arises. The nickel hydroxide serving as an active material, in X-ray diffractometry, comes to have reduced values of the peak intensity ratio between the (100) plane and (001) plane, (100)/(001), the peak intensity ratio between the (101) plane and (001) plane, (101)/(001), and the half width of the peak for the (101) plane, and the coefficient of use of the positive active material decreases accordingly (second problem).

"Background Art 2"

Since nickel/metal-hydride storage batteries, which are a kind of alkaline storage batteries, have a high energy density, they are extensively used as power sources for portable small electronic appliances including pocket telephones and small personal computers. The demand for the batteries is increasing remarkably.

Incidentally, a nickel/metal-hydride storage battery generally has a nickel electrode having a positive active material and a negative electrode having a hydrogen-absorbing alloy. This nickel electrode contains a low-order cobalt compound in which the cobalt has an oxidation number of 2 or smaller, e.g., cobalt hydroxide, so as to have enhanced conductivity and thereby improve the coefficient of use of the active material. During initial charge, this low-order cobalt compound is oxidized into a high-order cobalt compound in which the cobalt has an oxidation number larger than 2. The cobalt compound thus forms a conductive network to heighten the coefficient of use of the active material. This high-order cobalt compound is thought to be cobalt oxyhydroxide.

However, there have been cases where when alkaline storage batteries having such a nickel electrode are overdischarged, the conductive network is impaired and the restoration of discharge capacity becomes insufficient. The same applies in the case of long-term discharge at a high temperature.

Nickel/metal-hydride storage batteries further have the following drawback. At temperatures around ordinary temperature, the difference between the potential at which oxygen is evolved by the decomposition of the water constituting the electrolytic solution, i.e., oxygen evolution potential, and the potential at which the reaction in which the nickel hydroxide as the positive active material is oxidized to nickel oxyhydroxide occurs, i.e., oxidation reaction potential, is large and, hence, a high charge efficiency can generally be expected. At high temperatures, however, the difference between the oxygen evolution potential and the oxidation reaction potential becomes small and, hence, the charge efficiency tends to decease. Since nickel/metal-hydride storage batteries in many cases are usually disposed in small spaces, the temperature increase caused by, e.g., heat generation during charge/discharge is unavoidable and it is difficult to maintain a high charge efficiency in many cases.

Various techniques for inhibiting the charge efficiency of nickel/metal-hydride storage batteries from decreasing at high temperatures have been investigated. Examples thereof include (6) the technique described in JP-A-3-78965, JP-A-7-45281, etc., and (7) the technique described in JP-A-9-92279, JP-A-5-28992, JP-A-11-250908, etc.

However, the technique (6) shown above has not been always satisfactory in "the effect of inhibiting the charge efficiency from decreasing at high temperatures". Furthermore, in the technique (7) shown above, it is difficult to obtain a sufficient charge efficiency from the beginning and there have been cases where a decrease in energy density occurs or no effect is observed (third problem).

"Background Art 3"

Recently, alkaline storage batteries such as nickel/metal-hydride storage batteries, nickel-cadmium storage batteries, and nickel-zinc storage batteries have come to be used as power sources for high-rate charge/discharge in power tools, hybrid electromobiles, and the like. The demand for these batteries is increasing rapidly.

Incidentally, nickel electrodes for use as the positive electrodes of alkaline storage batteries are classified into sinter electrodes and non-sinter electrodes. The sinter electrodes are obtained by depositing a positive active material comprising nickel hydroxide on a sintered substrate. The non-sinter electrodes are obtained by preparing a slurry of positive active material particles comprising nickel hydroxide using a thickener and other ingredients and coating or impregnating a foamed metallic substrate or the like with the slurry. Because the non-sinter electrodes can attain a higher capacity and because of the ease of production thereof, etc., they are coming to be frequently used in place of the sinter electrodes.

However, the non-sinter electrodes heretofore in use have had a problem that they are inferior in high-rate charge/discharge characteristics to the sinter electrodes. The main reasons for this are that the distance between the substrate and the positive active material particles is long and that the contacts between the positive active material particles differ in conductivity. An attempt was hence made to improve high-rate charge/discharge characteristics by adding a cobalt compound to a positive active material (see, for example, JP-A-62-256366). Namely, the cobalt compound added first dissolves in an alkaline electrolytic solution and thereafter reprecipitates as cobalt hydroxide, upon which reprecipitation the cobalt compound forms a network connecting the positive active material particles and the substrate. This network changes into a satisfactory conductive network when the cobalt hydroxide is oxidized into a highly conductive cobalt compound by the first charge of the battery. Consequently, high-rate charge/discharge characteristics are improved.

On the other hand, alkaline storage batteries have a drawback that when charge and discharge are repeated at a high current, the battery temperature increases and the battery which is still in an insufficiently cooled state shifts into the succeeding mode of charge or discharge. In particular, alkaline storage batteries are coming to be more frequently used in a high-temperature environment. In batteries of the type made up of nickel/metal-hydride storage cells assembled together, temperature unevenness among the individual cells has become large. Nickel/metal-hydride storage batteries have further had a problem that the charge efficiency thereof at high temperatures is considerably low. The reason for this is that during charge at high temperatures, the difference between the oxidation potential for the nickel hydroxide and the oxygen evolution potential in the final stage of charge is small and, hence, competitive reactions respectively for oxidation and for oxygen evolution occur. It has therefore been proposed to add to a nickel electrode a compound having the effect of shifting the oxygen evolution potential of a nickel electrode in the final stage of high-temperature charge to the nobler side. Specifically, this compound is a rare-earth compound. This technique is disclosed, for example, in (8) JP-A-5-28992, JP-A-6-150925, JP-A-8-195198, JP-A-9-92279, etc.

However, there have been cases where the addition of a rare-earth compound arouses troubles that the rare-earth compound inhibits the dissolution of cobalt ions in the electrolytic solution and the precipitation of cobalt hydroxide from the electrolytic solution or the rare-earth compound dissolves in the electrolytic solution and deposits on the negative electrode to heighten the resistance of the negative electrode. There has hence been a problem in the addition of a rare-earth compound that high-rate discharge characteristics deteriorate although the high-temperature charge efficiency is improved.

On the other hand, the above-described technique in which cobalt hydroxide is oxidized by the first charge of the battery to thereby form a satisfactory conductive network has a drawback that since the oxidation of the cobalt hydroxide by charge is an irreversible reaction, the negative electrode at the time of discharge termination has electricity remaining undischarged. A discharge reserve is generated also by the corrosion of the hydrogen-absorbing alloy employed in the negative electrode. Furthermore, for inhibiting a sealed alkaline storage battery from undergoing hydrogen evolution at the negative electrode in the final stage of charge, it is necessary to impart a charge reserve to the negative electrode. This impartation of a charge reserve inhibits hydrogen evolution at the negative electrode and accelerates the absorption of the oxygen evolved at the positive electrode, so that the internal pressure of the battery can be inhibited from increasing in the final stage of charge. Consequently, increasing a charge reserve by reducing a discharge reserve makes it possible to inhibit the internal pressure of the battery from increasing during high-rate charge. Furthermore, since a discharge reserve gradually accumulates with charge/discharge cycles to reduce the charge reserve, a reduction in discharge reserve improves charge/discharge cycle characteristics. Moreover, the increase in charge reserve by a reduction in discharge reserve makes it possible to inhibit the hydrogen-absorbing alloy in the negative electrode from becoming finer particles. The hydrogen-absorbing alloy thus inhibited from becoming finer particles is inhibited from corrosion and makes it possible to inhibit the generation of a discharge reserve.

Incidentally, the following has been proposed as a technique for attaining a reduction in discharge reserve. Namely, as explained above in (5) under "Background Art 1", an attempt has been made in JP-A-2000-223119 in which a high-order cobalt compound having a cobalt oxidation number larger than 2 is deposited on the surface of positive active material particles comprising nickel hydroxide and the nickel hydroxide is partly oxidized with an oxidizing agent in an aqueous alkali solution.

However, the positive active material obtained by the synthesis method described above has had the following problems. Namely, as pointed out as the "first problem", when the oxidation treatment is conducted in a high-concentration aqueous alkali solution at a high temperature, part of the nickel hydroxide is oxidized to $\gamma$-NiOOH and the tap density of the positive active material particles decreases. There is hence a problem that the decrease in tap density is contrary to the desired density increase in positive active materials and this in turn is contrary to the desired capacity increase. On the other hand, when the oxidation treatment is conducted in a low-concentration aqueous alkali solution at a low temperature, not only the coefficient of use of the positive active material in discharge decreases mainly due to an increased powder resistance, but also an inactive nickel oxide is yielded as a by-product. Thus, in the oxidation treatment in an aqueous alkali solution, the coefficient of use of the positive active material in discharge is inconsistent with the tap density of the active material (fourth problem).

OBJECTS OF THE INVENTION

The invention has first been achieved in view of the first problem described above. An object of the invention is to provide a nickel electrode material which has a satisfactory tap density and can attain a sufficient reduction in discharge reserve and a process for producing the nickel electrode material, and to provide a nickel electrode and an alkaline storage battery having a high capacity and excellent internal-pressure characteristics (hereinafter referred to as "first object").

The invention has secondly been achieved in view of, in particular, the second problem described above in addition to the first object. Another object of the invention is to provide a nickel electrode material which can attain a reduction in discharge reserve and attain a coefficient of active-material use of nearly 100%, and to provide a process for producing the nickel electrode material, a nickel electrode, and an alkaline storage battery (hereinafter referred to as "second object").

Furthermore, the invention has thirdly been achieved in view of, in particular, the third problem described above in addition to the first object. A still other object of the invention is to provide a nickel electrode material excellent in restoration of discharge after over discharge, restoration of discharge after long-term standing at a high temperature, and high-temperature characteristics, and to provide a process for producing the nickel electrode material, a nickel electrode, and an alkaline storage battery (hereinafter referred to as "third object").

Moreover, the invention has fourthly been achieved in view of, in particular, the fourth problem described above in addition to the first object. A further object of the invention is to provide a nickel electrode material which has a satisfactory tap density and powder resistance, can attain a sufficient reduction in discharge reserve, and is excellent in both high-temperature charge characteristics and high-rate discharge characteristics, and to provide a process for producing the nickel electrode material, a nickel electrode, and an alkaline storage battery (hereinafter referred to as "fourth object").

DISCLOSURE OF THE INVENTION (Nickel Electrode Material according to the Invention)

The nickel electrode material according to the invention is (1) a nickel electrode material for use in a nickel electrode, characterized in that the positive-electrode material constituting the electrode material comprises: positive active material particles which comprise as the main component either a nickel hydroxide or a solid solution in a nickel hydroxide of one or more other elements and in which part of the nickel hydroxide has been oxidized; and a coating layer formed on the surface of the positive active material particles and comprising as the main component a high-order cobalt compound in which the cobalt has an oxidation number larger than 2, and that the average oxidation number of the nickel in the positive active material particles and the cobalt in the coating layer is from 2.04 to 2.40, and the positive-electrode material has a tap density of 2.0 g/cm$^3$ or higher (preferably 2.1 g/cm$^3$ or higher). With this electrode material, the first object can be accomplished.

Namely, according to the nickel electrode material described above, since part of the nickel hydroxide as a positive active material has been oxidized, the generation of irreversible electricity by initial charge after battery fabrication is prevented in an amount corresponding to the oxidation. Furthermore, since the coating layer comprises a high-order cobalt compound as the main component, the generation of irreversible electricity by initial charge after battery fabrication is prevented in an amount corresponding to the use of the cobalt compound. Consequently, in batteries employing this nickel electrode material, a sufficient reduction in discharge reserve is attained and, hence, the batteries are inhibited from undergoing an increase in internal pressure and have improved cycle life characteristics. Moreover, since this nickel electrode material has a tap density of 2.0 g/cm³ or higher (preferably 2.1 g/cm³ or higher), a high degree of impregnation is obtained. Consequently, in electrodes employing this nickel electrode material, a higher electrode material density and hence a higher capacity can be attained.

In the nickel electrode material, the reason why the average oxidation number of the nickel in the positive active material particles and the cobalt in the coating layer is regulated to "from 2.04 to 2.401" is that average oxidation numbers below 2.04 make it difficult to obtain the effect of reducing discharge reserve. Namely, in alkaline storage batteries employing a nickel electrode material in which that average oxidation number is below 2.04, the negative electrode is less apt to have a reduced discharge reserve, resulting in a possibility that a sufficient charge reserve might be difficult to secure. As a result, there is a possibility that during the overcharge of the alkaline storage batteries, hydrogen gas evolution at the negative electrode might be accelerated to make it difficult to inhibit the internal-pressure increase in the alkaline storage batteries. Conversely, in case where the average oxidation number thereof exceeds 2.40, the battery employing this nickel electrode material has a reduced capacity because the negative electrode cannot be sufficiently charged. Namely, alkaline storage batteries employing a necked electrode material in which the average oxidation number exceeds 2.40 may have a reduced discharge capacity because the battery capacity is governed by the negative electrode. As a result, there is a possibility that the cycle life of the alkaline storage batteries might be impaired.

In the nickel electrode material described above, (2) the proportion of the coating layer in the nickel electrode material is preferably from 3 to 10% by weight. When the proportion of the coating layer is within this range, the conductivity of the positive active material and the electrode capacity become even better. In case where the proportion thereof is lower than 3% by weight, there is a possibility that the conductivity of the positive active material cannot be heightened sufficiently, making it difficult to improve the coefficient of use. In case where the proportion thereof exceeds 10% by weight, the relative amount of the positive active material in the electrode material decreases and this may lead to a decrease in electrode capacity.

The positive-electrode material constituting the nickel electrode material preferably is one which has a powder resistance lower than 200 Ωcm, especially lower than 40 Ωcm. Such a low powder resistance gives high conductivity. Consequently, in electrodes employing this nickel electrode material, a high coefficient of active-material use is obtained.

In the nickel electrode material described above, (3) the nickel hydroxide in the positive active material particles preferably is one in which, in X-ray diffractometry, the peak intensity ratio between the (100) plane and (001) plane, (100)/(001), and the peak intensity ratio between the (101) plane and (001) plane, (101)/(001), each are 0.5 or higher and the half width of the peak for the (101) plane is larger than 0.8 degrees and not larger than 1.2 degrees (preferably from 0.9 to 1.2 degrees). According to this constitution, especially the second object described above can be accomplished.

Namely, a reduction in discharge reserve and a coefficient of active-material use of nearly 100% can be attained and a high tap density of the active material is maintained. Half widths smaller than 0.8 degrees are undesirable because the coefficient of use of the active material is low. Half widths exceeding 1.2 degrees are undesirable because the active material has a reduced tap density.

Furthermore, in the nickel electrode material described above, (4) the high-order cobalt compound constituting the coating layer preferably is one which is capable of being electrochemically oxidized/reduced, has an electric double-layer capacity, and has a half width for the (003) plane of 0.7 degrees or larger in X-ray diffractometry. According to this constitution, especially the third object described above can be accomplished.

Namely, that high-order cobalt compound is lowly crystalline and, hence, even through over discharge or long-term standing at a high temperature, the high-order cobalt compound is not destroyed and retains the conductive network. Consequently, the nickel electrode material shows satisfactory properties concerning the restoration of discharge after over discharge or long-term standing. In addition, since the high-order cobalt compound in X-ray diffractometry has a half width for the (003) plane of 0.7 degrees or larger, high conductivity is obtained without fail. This high-order cobalt compound preferably has a specific surface area of 4 m²/g or larger in terms of BET area. Use of this cobalt compound can give a sufficient electric double-layer capacity.

A nickel electrode material according to the invention is the nickel electrode material described above which is characterized in (5) that the positive-electrode material constituting the electrode material comprises: positive active material particles comprising a solid solution in a nickel hydroxide of both cobalt and zinc; and a coating layer formed on the surface of the active material particles and comprising as the main component a high-order cobalt compound in which the cobalt has an oxidation number larger than 2, and that the average oxidation number of the nickel in the positive active material particles and the cobalt in the coating layer is from 2.04 to 2.40, the amounts of the cobalt and zinc contained in solution in the positive active material are from 0.5 to 4% by weight (more preferably from 0.65 to 4% by weight) and from 1 to 5% by weight, respectively, in terms of metal amount, and the proportion of all cobalt in the positive-electrode material, including the cobalt contained in solution in the positive active material and the cobalt contained in the coating layer, is from 3 to 10% by weight in terms of metal amount. According to this constitution, a nickel electrode material comprising a positive-electrode material which can attain a reduction in discharge reserve, has high conductivity, and attains a high active-material impregnation density is obtained.

This nickel electrode material according to the invention preferably is the nickel electrode material described above in which (6) a compound containing one or more rare earth elements is incorporated in the positive active material particles and/or disposed on the surface of the positive-electrode material. The compound containing one or more rare earth elements preferably is an oxide or hydroxide containing at least one of Yb, Er, Lu, Tm, and Y. The proportion of this "compound containing one or more rare earth elements" in the nickel electrode material is preferably from 0.1 to 20% by weight, especially preferably from 0.5 to 10% by weight.

By thus incorporating or disposing a compound containing one or more rare earth elements, the fourth object described above can especially be accomplished. Namely, the incorporation and/or disposition of a compound containing one or more rare earth elements increases the difference between the oxygen evolution potential and the oxidation potential in the nickel electrode and, hence, the charge efficiency can be further improved. Furthermore, a nickel electrode material which can attain a sufficient reduction in discharge reserve and is excellent in both high-temperature charge characteristics and high-rate discharge characteristics can be provided.

(Process for Nickel Electrode Material Production According to the Invention)

The process for nickel electrode material production according to the invention is characterized by comprising: an "oxidation treatment step" in which a material which comprises positive active material particles comprising as the main component either a nickel hydroxide or a solid solution in a nickel hydroxide of one or more other elements and a coating layer formed on the surface of the active material particles and comprising a low-order cobalt compound in which the cobalt has an oxidation number of 2 or smaller is subjected to an oxidation treatment with an oxidizing agent in water or in an aqueous alkali solution with a concentration of 20% by weight or lower at a temperature of 60° C. or lower to thereby oxidize the low-order cobalt compound and part of the nickel hydroxide to such a degree that the average oxidation number of the nickel in the positive active material and the cobalt in the coating layer becomes 2.04 to 2.40; and a "heat treatment step" in which an aqueous alkali solution with a concentration of 30% by weight or higher is added to the material which has undergone the oxidation treatment, and the material is heat-treated at a temperature of 80° C. or higher.

By the "oxidation treatment step", the low-order cobalt compound and part of the nickel hydroxide are oxidized. Upon oxidation, the low-order cobalt compound becomes a high-order cobalt compound in which the cobalt has an oxidation number larger than 2. This high-order cobalt compound is thought to be cobalt oxyhydroxide (CoOOH).

In the "oxidation treatment step", the oxidation treatment conditions are relatively mild because the alkali concentration and the temperature are relatively low, so that the tap density is inhibited from decreasing. On the other hand, in the "heat treatment step", since the alkali concentration and the temperature are relatively high, the crystal structure of the high-order cobalt compound obtained in the "oxidation treatment step" is lowly crystalline, resulting in a reduced powder resistance. Consequently, according to the production process described above, the nickel electrode material according to the invention, i.e., a nickel electrode material having a satisfactory tap density and satisfactory powder resistance and having high density and high conductivity, can be obtained.

In the process for nickel electrode material production according to the invention, preferred heat treatment conditions in the "heat treatment step" include "a temperature of from 80 to 140° C. and a period of from 0.5 to 10 hours". According to this constitution, the "nickel hydroxide in the positive active material particles" obtained can have the "peak intensity ratios and half width" specified in (3) above. As a result, a coefficient of active-material use of nearly 100% is obtained and a high tap density of the active material can be maintained, as stated above. Treatment periods shorter than 0.5 hours are undesirable because the above-described effects of the heat treatment cannot be obtained. Treatment periods exceeding 10 hours are undesirable because the peak intensity ratios and half width become smaller than the respective values specified above, resulting in a reduced coefficient of use of the active material.

(Nickel Electrode According to the Invention)

A nickel electrode according to the invention is characterized by being obtained by impregnating a porous substrate with the nickel electrode material according to the invention described above. According to this constitution, the quantity of electricity corresponding to the irreversible oxidation-reduction reactions of nickel hydroxide and cobalt hydroxide is eliminated. Furthermore, the irreversible reactions of nickel hydroxide and cobalt hydroxide are inhibited. In addition, a nickel electrode which has a coefficient of active-material use of nearly 100% and has a large active-material impregnation amount can be obtained.

Another nickel electrode according to the invention is characterized by being obtained by incorporating a compound containing one or more rare earth elements into the nickel electrode material according to the invention described above and impregnating a porous substrate with the resultant mixture. Since a compound containing one or more rare earth elements has been incorporated, high-temperature charge characteristics become even better. Namely the nickel electrode obtained with the nickel electrode material, during charge, has an oxygen evolution potential shifted to the nobler side due to the rare-earth compound, so that oxygen evolution is inhibited and nickel oxidation is enhanced. Consequently the charge efficiency can be further improved.

The compound containing one or more rare earth elements is incorporated in an amount of preferably from 0.5 to 10% by weight. In case where the amount thereof is smaller than 0.5% by weight, the effect of improving charge efficiency at temperatures not lower than room temperature is difficult to obtain. Conversely, in case where the amount thereof exceeds 10% by weight, the active-material impregnation amount decreases although the effect of improving charge efficiency is obtained. Such too large amounts are hence unsuitable for capacity increase.

(Alkaline Storage Battery According to the Invention)

An alkaline storage battery according to the invention is an alkaline storage battery having a nickel electrode, characterized in that the positive-electrode material of the nickel electrode contained in the alkaline storage battery comprises: positive active material particles which comprise as the main component either a nickel hydroxide or a solid solution in a nickel hydroxide of one or more other elements and in which part of the nickel hydroxide has been oxidized; and a coating layer formed on the surface of the positive active material particles and comprising as the main component a high-order cobalt compound in which the cobalt has an oxidation number larger than 2, and that the average oxidation number of the nickel in the positive active material particles and the cobalt in the coating layer is from 2.04 to 2.40, and the positive-electrode material has a tap density of 2.0 g/cm$^3$ or higher (preferably 2.1 g/cm$^3$ or higher). This alkaline storage battery has a high capacity because of the high tap density. Furthermore, since a reduction in discharge reserve is attained, the battery has excellent internal-pressure characteristics and improved cycle life characteristics. (With respect to the reason why the average oxidation number is regulated to "from 2.04 to 2.40", see the related statement given hereinabove.)

In the alkaline storage battery described above, the proportion of the coating layer in the nickel electrode material is preferably from 3 to 10% by weight. When the proportion of the coating layer is within this range, the conductivity of the positive active material and the electrode capacity become even better.

The positive-electrode material in the alkaline storage battery preferably is one which has a powder resistance lower than 200 Ωcm, especially lower than 40 scm. Such a low powder resistance enables an improved efficiency of use of the active material, so that the coefficient of use of actual capacity, the coefficient of use in high-rate discharge, and the coefficient of use after over discharge become excellent.

In the alkaline storage battery according to the invention described above, the nickel hydroxide in the positive active material particles preferably is one in which, in X-ray diffractometry, the peak intensity ratio between the (100) plane and (001) plane, (100)/(001), and the peak intensity ratio between the (101) plane and (001) plane, (101)/(001), each are 0.5 or higher and the half width of the peak for the (101) plane is larger than 0.8 degrees and not larger than 1.2 degrees (preferably from 0.9 to 1.2 degrees). According to this constitution, a coefficient of active-material use of nearly 100% can be obtained and a high tap density of the active material is maintained. (With respect to the reasons why the half width is regulated so as to be "larger than 0.8 degrees and not larger than 1.2 degrees", see the related statement given hereinabove.)

In the alkaline storage battery according to the invention described above, the high-order cobalt compound constituting the coating layer preferably is one which is capable of being electrochemically oxidized/reduced, has an electric double-layer capacity, and has a half width for the (003) plane of 0.7 degrees or larger in X-ray diffractometry. (With respect to the reasons for the preference of this cobalt compound, see the related statement given hereinabove.)

This high-order cobalt compound preferably has a specified surface area of 4 $m^2/g$ or larger in terms of BET area. Use of this cobalt compound can give a sufficient electric double-layer capacity.

Another alkaline storage battery according to the invention is characterized by having a positive-electrode material which comprises positive active material particles comprising a solid solution in a nickel hydroxide of both cobalt and zinc and a coating layer formed on the surface of the active material particles and comprising as the main component a high-order cobalt compound in which the cobalt has an oxidation number larger than 2, the average oxidation number of the nickel and cobalt in the positive active material and the cobalt in the coating layer being from 2.04 to 2.40, and by having a discharge reserve amount regulated to 15% or smaller. It is preferred that the amounts of the cobalt and zinc contained in solution in the positive active material be from 0.5 to 4% by weight (more preferably from 0.65 to 4% by weight) and from 1 to 5% by weight, respectively, in terms of metal amount, and that the proportion of all cobalt in the positive-electrode material, including the cobalt contained in solution in the positive active material and the cobalt contained in the coating layer, be from 3 to 10% by weight in terms of metal amount. According to this constitution, the coefficient of use and impregnation density of the active material can be heightened and, hence, the battery can have a high capacity. Furthermore, since this alkaline storage battery has a reduced discharge reserve amount, it can have satisfactory cycle life characteristics.

An explanation is given here on discharge reserve amount (%), i.e., the proportion of discharge reserve to the theoretical capacity of the positive electrode. The discharge reserve amounts of alkaline storage batteries heretofore in use are generally from 20 to 25%. However, preferred discharge reserve amounts are 15% or smaller, and the more preferred range thereof is from 5 to 10%. Discharge reserve amounts smaller than 5% are undesirable because the discharge of such batteries is controlled by the negative electrode, resulting in a reduced coefficient of use. On the other hand, discharge reserve amounts exceeding 15% are undesirable because such large discharge reserve amounts result in reduced cycle performance.

This alkaline storage battery according to the invention preferably is one in which the positive active material particles contain a compound containing one or more rare earth elements, and/or the positive-electrode material has, disposed on the surface thereof, a compound containing one or more rare earth elements. The proportion of this "compound containing one or more rare earth elements" in the nickel electrode material is preferably from 0.1 to 20% by weight, especially preferably from 0.5 to 10% by weight.

By thus incorporating or disposing a compound containing one or more rare earth elements, the difference between the oxygen evolution potential and the oxidation potential in the nickel electrode is increased and, hence, the charge efficiency can be further improved. Furthermore, it is possible to provide an alkaline storage battery which can attain a sufficient reduction in discharge reserve, can simultaneously have enhanced high-rate discharge characteristics and an increased high-temperature charge efficiency, and can have an increased capacity while attaining size reduction.

BRIEF DESCRIPTION OF THE DRAWINGS

(In FIG. 5, numeral 1 denotes an alkaline storage battery, 2 a case, 3 a positive electrode, 4 a negative electrode, and 5 a separator.)

BEST MODE FOR CARRYING OUT THE INVENTION

Figure 1:
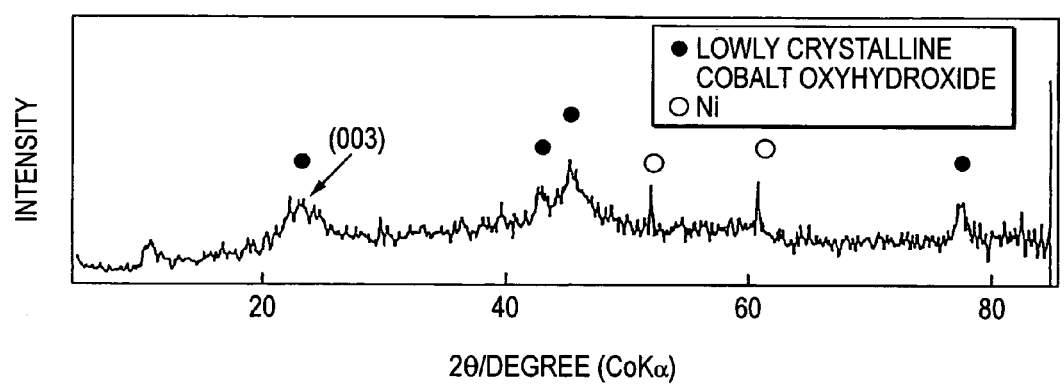
FIG. 1 is a presentation showing an "X-ray diffraction pattern of the high-order cobalt compound" in a nickel electrode material according to the invention.

"Embodiments Common to Nickel Electrode Material, Nickel Electrode, and Alkaline Storage Battery according to the Invention"

In the nickel electrode material according to the invention, the nickel electrode employing the electrode material, and the alkaline storage battery having the nickel electrode, the positive-electrode material constituting the electrode material comprises "positive active material particles which comprise as the main component either a nickel hydroxide or a solid solution in a nickel hydroxide of one or more other elements and in which part of the nickel hydroxide has been oxidized" and "a coating layer formed on the surface of the positive active material particles and comprising as the main component a high-order cobalt compound in which the cobalt has an oxidation number larger than 2".

The nickel hydroxide is not particularly limited, and known ones for use as positive active materials for alkaline storage batteries can be used. In general, α-form nickel hydroxide (α-Ni(OH)$_2$) and β-form nickel hydroxide (β-Ni(OH)$_2$) are preferred.

The one or more other elements contained in a solid solution state in the nickel hydroxide preferably are one or more members selected from cobalt, zinc, magnesium, cadmium, aluminum, and manganese. The amount of such elements to be contained in a solid solution state is preferably 2 parts by weight or more in terms of the amount of elemental metals.

In the case where cobalt is contained in a solid solution state, the charge potential of the nickel electrode material can be shifted to the base side and an alkaline storage battery can be designed to have a large difference between the charge potential and the oxygen evolution potential. This alkaline storage battery can hence have an improved charge efficiency at high temperatures. Furthermore, the generation of γ-NiOOH, which is causative of a decrease in the charge/discharge cycle life of alkaline storage batteries, can be inhibited.

In the case where zinc is contained in a solid solution state, the oxygen evolution potential is shifted to the nobler side and this brings about an enlarged difference between the charge potential and the oxygen evolution potential and an improved charge efficiency at high temperatures. In the case where any of zinc, magnesium, and cadmium is contained in a solid solution state, the generation of γ-NiOOH during charge, in particular in the final stage of charge, is effectively inhibited. Consequently, the nickel electrode (positive electrode) is inhibited from expanding and, as a result, the localization of an electrolytic solution on the positive-electrode side can be diminished and the charge/discharge cycle life is improved.

Furthermore, when $\alpha$-Ni(OH)$_2$ is used as the nickel hydroxide and aluminum or manganese is contained in a solid solution state, then the $\alpha$-Ni(OH)$_2$ is stabilized, although $\alpha$-Ni(OH)$_2$ is unstable in high-concentration alkaline electrolytic solutions in ordinary use in alkaline storage batteries. Namely, the $\alpha$-Ni(OH)$_2$ is inhibited from changing in form into $\beta$-Ni(OH)$_2$. As a result, the oxidation-reduction reactions between the $\alpha$-Ni(OH)$_2$ and γ-NiOOH, which is a high-order oxide thereof, become easy to utilize as charge/discharge reactions. Consequently, the positive electrode can have a higher capacity. In this connection, when $\beta$-Ni(OH)$_2$ is used, reversible reactions (oxidation-reduction reactions) between the $\beta$-Ni(OH)$_2$ and $\beta$-NiOOH occur as 1-electron reactions. In contrast, the reversible reactions (oxidation-reduction reactions) between $\alpha$-Ni(OH)$_2$ and γ-NiOOH are 1.5-electron reactions and, hence, enable the positive electrode to have a higher capacity. In addition, since use of $\alpha$-Ni(OH)$_2$ is effective also in inhibiting the expansion of the positive electrode, it contributes also to an improvement in charge/discharge cycle life.

Besides cobalt oxyhydroxide (CoOOH), examples of the "high-order cobalt compound" in the invention include mixtures of at least one cobalt compound selected from $Co_3O_4$, $CoHO_2$, and $A_xCo_zO_yH\alpha$ (wherein A is an alkali metal or alkaline earth metal; x,y,z>0; and $\alpha \geqq 0$) with cobalt oxyhydroxide.

"Embodiments of Process for Nickel Electrode Material Production According to the Invention"

The nickel electrode material according to the invention can be obtained specifically through the following steps (a) to (c).

Step (a): Positive active material particles are produced.

Step (b): A coating layer comprising a low-order cobalt compound in which the cobalt has an oxidation number of 2 or smaller is formed on the surface of the positive active material particles to obtain positive-electrode material particles.

Step (c): The positive-electrode material particles are oxidized (oxidation treatment step) and then heated (heat treatment step).

"Step (a): Step for Producing Positive Active Material Particles"

For example, an aqueous solution containing given amounts of nickel sulfate, zinc sulfate, and cobalt sulfate in combination, an aqueous ammonium sulfate solution, and an aqueous sodium hydroxide solution are added little by little to and mixed with a reaction bath comprising an aqueous solution containing give amounts of ammonium sulfate and sodium hydroxide and regulated so as to have a pH of from 8 to 12 and a temperature of from 40 to 50° C., while stirring the reaction bath. Throughout this operation, the pH and temperature of the reaction bath are kept at values within those ranges. Thus, nickel hydroxide particles containing zinc hydroxide and cobalt hydroxide which have been incorporated therein in a solid solution state through ammine complex ions, i.e., positive active material particles, are yielded. Regulating the pH of the reaction bath to 8 to 10 gives $\alpha$-Ni(OH)$_{21}$ while regulating the pH thereof to 10 to 12 gives $\beta$-Ni(OH)$_2$.

When the zinc sulfate and cobalt sulfate are omitted in the production process described above, positive active material particles consisting of a nickel hydroxide are yielded.

"Step (b): Step for Forming Coating Layer"

An aqueous solution of cobalt sulfate and an aqueous solution of sodium hydroxide are simultaneously added little by little to and mixed with a reaction bath comprising an aqueous alkali solution containing sodium hydroxide and having a pH regulated to 11 to 13 and the positive active material particles immersed therein, while stirring the reaction bath. Throughout this operation, the pH of the reaction bath is kept at a value within that range. Thus, a coating layer comprising a cobalt hydroxide is formed on the surface of the positive active material. Namely, positive-electrode material particles consisting of the positive active material particles and, formed on the surface thereof, a coating layer comprising a low-order cobalt compound are yielded. According to need, ammonium sulfate may be incorporated into the reaction bath, and an aqueous ammonium sulfate solution may be used as an aqueous solution to be added.

"Step (c): Oxidation Treatment Step and Heat Treatment Step"

This process according to the invention is characterized in that the positive-electrode material particles are oxidized with an oxidizing agent in water or in an aqueous alkali solution of 20% by weight or lower at a temperature of 60° C. or lower (oxidation treatment step) and then heated at a temperature of 80° C. or higher in an aqueous alkali solution of 30% by weight or higher (heat treatment step). In one embodiment of this step (c), the positive-electrode material particles are treated, for example, by adding an aqueous sodium hydroxide solution of from 5 to 10% by weight thereto, oxidizing the particles with an oxidizing agent at 50° C., and then heating the particles at 100° C. in 30% by weight aqueous sodium hydroxide solution.

Through the "oxidation treatment step", the cobalt in the coating layer and part of the nickel in the positive active material are oxidized. Because of this, the generation of an irreversible electric capacity by the first charge after battery fabrication is prevented in an amount corresponding to the oxidation. Consequently, in batteries employing the nickel electrode material obtained, a sufficient reduction in discharge reserve is attained. The reduction in discharge reserve brings about an increased charge reserve and, hence, the batteries come to have excellent internal-pressure characteristics and excellent charge/discharge cycle characteristics. Furthermore, the reduction in discharge reserve inhibits hydrogen evolution at the negative electrode during high-temperature standing. Hydrogen evolved at the negative electrode is causative of self-discharge at the positive electrode. In the invention, however, since hydrogen evolution is inhibited, self-discharge at the positive electrode is inhibited and, hence, the positive-electrode voltage is inhibited from decreasing. The coefficient of use after high-temperature standing is thus improved as stated above.

The oxidation treatment in the invention is conducted at a temperature of 60° C. or lower in water or in an aqueous alkali solution of 20% by weight or lower. The tap density is hence prevented from decreasing through the oxidation treatment. Oxidation treatments conducted in an aqueous alkali solution having a concentration higher than 20% by weight or at a temperature higher than 60° C. are undesirable because such conditions result in a considerable decrease in tap density.

The positive-electrode material obtained through the oxidation treatment step has a high powder resistance. However, this positive-electrode material comes to have a sufficiently reduced powder resistance through the heat treatment step because an aqueous alkali solution of 30% by weight or higher is added thereto and the material is heat-treated at a temperature of 80° C. or higher. In case where an aqueous alkali solution having a concentration lower than 30% by weight or a temperature lower than 80° C. is used to conduct heat treatment, a sufficiently low powder resistance is not obtained.

In step (b), a cobalt hydroxide is formed as a low-order cobalt compound. However, the low-order cobalt compound to be formed may be elemental cobalt or a cobalt compound capable of releasing a cobalt ion in alkali solutions for use as electrolytic solutions in alkaline storage batteries, such as, e.g., α-form cobalt hydroxide, β-form cobalt hydroxide, or cobalt monoxide. Cobalt hydroxides are preferred from the standpoint of ease of the formation of cobalt oxyhydroxide.

Although an aqueous sodium hydroxide solution is used as an aqueous alkali solution in step (a) and step (b), the aqueous alkali solution is not limited thereto. It is preferred to use as the aqueous alkali solution an aqueous solution of one or more of lithium hydroxide, sodium hydroxide, and potassium hydroxide. With respect to the aqueous alkali solution to be used in the "oxidation treatment step" and "heat treatment step" in step (c), it is preferred to employ an aqueous solution of one or more of lithium hydroxide, sodium hydroxide, and potassium hydroxide.

The oxidizing agent to be used in the "oxidation treatment step" in step (c) preferably is one or more of potassium peroxodisulfate ($K_2S_2O_8$), sodium peroxodisulfate ($Na_2S_2O_8$), ammonium peroxodisulfate (($NH_4)_2S_2O_8$), and sodium hypochlorite (NaClO). Since these oxidizing agents can oxidize bivalent cobalt and bivalent nickel, not only the low-order cobalt compound constituting the coating layer but also the nickel hydroxide constituting the positive active material are oxidized without fail. The amount of the oxidizing agent to be added cannot be unconditionally specified because it varies depending on the kind of the oxidizing agent. It is, however, preferred to regulate the amount thereof to a value necessary for oxidizing the low-order cobalt compound to a desired high-order cobalt compound or to a value necessary for oxidizing to the high-order cobalt compound and for oxidizing a given amount of the nickel hydroxide to nickel oxyhydroxide.

Figure 2:
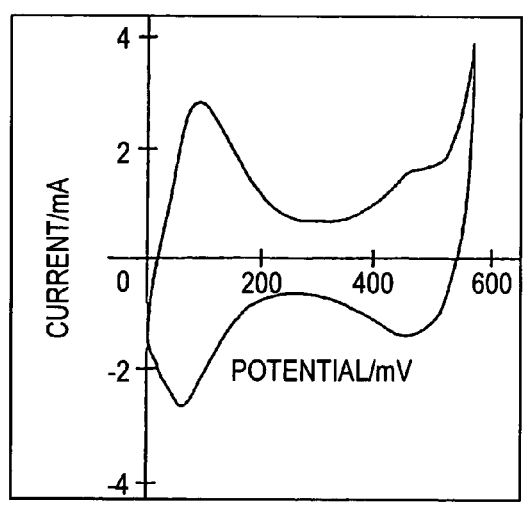
FIG. 2 is a presentation showing a "cyclic voltammogram of the high-order cobalt compound" in the nickel electrode material according to the invention.
Figure 3:
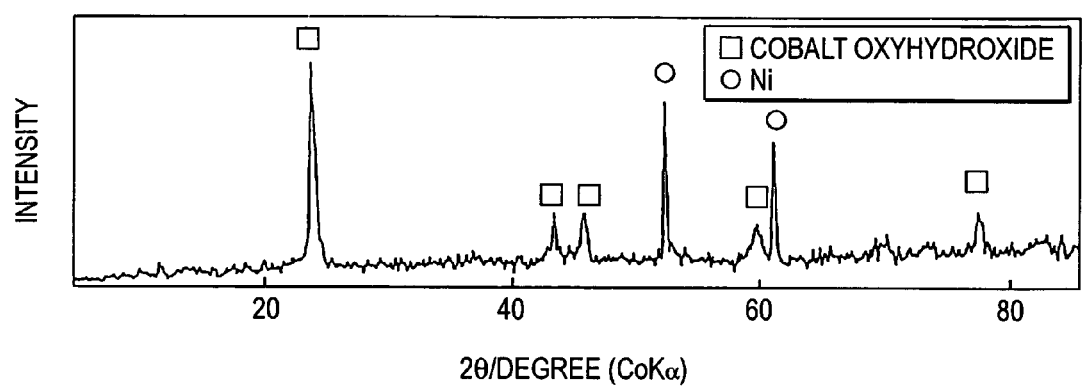
FIG. 3 is a presentation showing an "X-ray diffraction pattern of the high-order cobalt compound" in a nickel electrode material according to a related-art technique.
Figure 4:
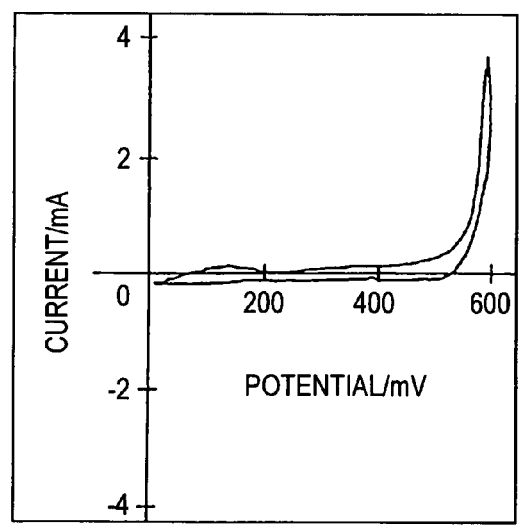
FIG. 4 is a presentation showing a "cyclic voltammogram of the high-order cobalt compound" in the nickel electrode material according to a related-art technique.

An X-ray diffraction pattern and cyclic voltammogram of a high-order cobalt compound obtained by subjecting the cobalt hydroxide to the oxidation treatment step and heat treatment step described in step (c) are given in FIG. 1 and FIG. 2, respectively. For the purpose of comparison, an X-ray diffraction pattern and cyclic voltammogram of a high-order cobalt compound obtained by impregnating a substrate with cobalt hydroxide particles to produce an electrode and charging the electrode at room temperature to thereby oxidize the cobalt hydroxide are given in FIG. 3 and FIG. 4, respectively. Conditions used for determining the cyclic voltammograms are as follows. Namely, a cellular substrate having a size of 1 cm×1 cm and impregnated with a high-order cobalt compound was used as a working electrode, and a nickel plate and Hg/HgO were used as a counter electrode and a reference electrode, respectively. As an electrolytic solution was used 30% by weight aqueous potassium hydroxide solution. Potential scanning was conducted from 0 to 600 mV at a rate of 5 mV/min.

As can be seen from FIG. 2, the high-order cobalt compound obtained through step (c) can be electrochemically oxidized/reduced and has an electric double-layer capacity. Furthermore, as FIG. 1 shows, the half width for the (003) plane in X-ray diffractometry is 0.7 degrees or larger. Consequently, the high-order cobalt compound obtained through step (c) is lowly crystalline. Besides cobalt oxyhydroxide (CoOOH), examples of the high-order cobalt compound in the invention include mixtures of at least one cobalt compound selected from $Co_3O_4$, $CoHO_2$, and $A_xCo_zO_yH\alpha$ (wherein A is an alkali metal or alkaline earth metal; x,y,z>0; and $\alpha \geq 1$) with cobalt oxyhydroxide.

"Embodiments of Nickel Electrode According to the Invention"

The nickel electrode can be produced by preparing a slurry or paste from the nickel electrode material according to the invention and coating or impregnating a current collector with the slurry or paste. The slurry or paste is prepared by adding either water or water containing a thickener dissolved therein to the electrode material and optionally further adding a binder. Examples of the thickener include polymeric compounds such as polyethylene glycol and poly(vinyl alcohol), carboxymethyl cellulose, methyl cellulose, and the like. Examples of the binder include polytetrafluoroethylene, styrene-butadiene rubbers, and the like.

The nickel electrode is produced by coating or impregnating a current collector with the slurry or paste prepared and drying the slurry or paste applied. It is preferred that after the drying, the resultant structure be pressed to densely fill the inner spaces of the current collector with the electrode material.

The current collector is not particularly limited as long as it is one in ordinary use in positive electrodes for alkaline storage batteries. However, from the standpoint of ease of dense impregnation with and holding of the electrode material, it is preferred to use a porous object, net structure, or perforated plate each made of a metal.

As the metallic porous object is preferably used a foamed metallic porous object. The foamed metallic porous object is a spongy metallic body, and can be produced, for example, by subjecting a foamed resin such as a urethane foam to electroless metal plating and then removing the foamed resin by heating. As the metallic net structure is preferably used, for example, a net structure made up of metallic fibers interlaced in a three-dimensional manner, such as a nonwoven fabric. As the metallic perforated plate can be used, for example, a punching metal, expanded metal, or the like.

In a preferred embodiment of the nickel electrode according to the invention, a compound containing one or more rare earth elements is incorporated. (An explanation on this embodiment is omitted here so as to avoid duplication with "Embodiments Employing Rare-Earth Compound" which will be described later.)

"Embodiments of Alkaline Storage Battery According to the Invention"

The alkaline storage battery comprises a nickel electrode, a negative electrode, a separator, and an alkaline electrolytic solution.

In the case where the battery is, for example, a nickel/metal-hydride storage battery, the negative electrode generally is one comprising a flexible current collector and disposed thereon a negative-electrode material containing a hydrogen-absorbing alloy. However, the negative electrode should not be construed as being limited thereto. The hydrogen-absorbing alloy to be used in the invention is not particularly limited, and a known one can be used. The negative electrode employing a hydrogen-absorbing alloy is produced, for example, in the following manner. A hydrogen-absorbing alloy powder having a composition represented by $Mm_\alpha Ni_\beta Al_\gamma Co_\delta Mn_\epsilon$ (wherein Mm is a mischmetal, which is a mixture of rare earth elements such as La, Ce, Pr, and Nd; and $\alpha$, $\beta$, $\gamma$, $\delta$, and $\epsilon$ each are $\geq 0$) and having a diameter of 75 µm or smaller is prepared. Water containing a thickener dissolved therein and polytetrafluoroethylene as a binder are added to the powder to prepare a paste. This paste is applied to both sides of a punching metal and dried. Thereafter, the coated punching metal is pressed for thickness regulation.

The separation is not particularly limited, and a known one can be used. Namely, the separator, which is used for preventing short-circuiting between the positive electrode and the negative electrode and for holding an electrolytic solution, is not particularly limited as long as it is usable in alkaline storage batteries. Examples thereof include nonwoven fabrics formed from polyolefin resin fibers, such as polypropylene resin fibers, or polyamide resin fibers. The polyolefin resin fibers or polyamide resin fibers to be used for forming such a nonwoven fabric may have been hydrophilized by the graft polymerization of, e.g., a sulfonating agent or acrylic acid according to need.

The alkaline electrolytic solution is not particularly limited, and a known one can be used. For example, an aqueous solution of at least one of potassium hydroxide, lithium hydroxide, and sodium hydroxide is preferred.

Figure 5:
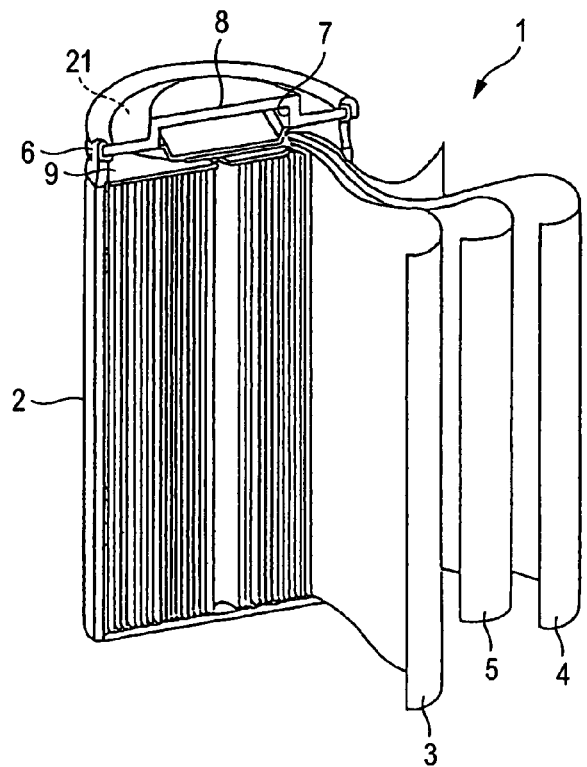
FIG. 5 is a cutaway slant view illustrating one embodiment of the alkaline storage battery according to the invention.

The battery can have, for example, the structure shown in FIG. 5. In FIG. 5, the alkaline storage battery 1 is a nickel/metal-hydride storage battery and comprises a case 2, a positive electrode (nickel electrode) 3, negative electrode 4, and separator 5 which are disposed in the case 2, and an alkaline electrolytic solution (not shown).

The case 2 is a nearly cylindrical vessel having an opening 21 at the top, and the bottom thereof serves as a negative terminal. The positive electrode 3, negative electrode 4, and separator 5 each are a strip-form member having flexibility. The positive electrode 3 and the negative electrode 4 have been disposed in the case 2 in the state of being spirally wound together with the separator 5 sandwiched therebetween. The opening 21 of the case 2, which contains an electrolytic solution injected thereinto, has been liquid-tightly sealed with a cover plate 7 through an insulating gasket 6. The cover plate 7 has a positive terminal 8 on its upper side. This positive terminal 8 has been connected to the positive electrode 3 through a lead 9, which electrically connects the cover plate 7 to the positive electrode 3.

In the alkaline storage battery 1, it is preferred to use as the electrolytic solution either an aqueous potassium hydroxide solution or an aqueous potassium hydroxide solution containing one or both of lithium hydroxide and sodium hydroxide. Especially when an aqueous potassium hydroxide solution containing one or both of lithium hydroxide and sodium hydroxide is used, the charge efficiency of the alkaline storage battery 1 can be heightened because this electrolytic solution is effective in shifting the oxygen evolution potential of the positive electrode to the nobler side. The amount of such an electrolytic solution to be used varies depending on battery shape. However, in the case of sealed cylindrical batteries, the amount thereof is generally preferably regulated to 0.8 to 1.3 ml per Ah of the capacity of the positive electrode 3. In case where the amount of the electrolytic solution is smaller than 0.8 ml, there is a possibility that the alkaline storage battery 1 might have a shortened charge/discharge cycle life. In case where the amount thereof exceeds 1.3 ml, the negative electrode 4 has a reduced gas-absorbing ability, resulting in a possibility that it might be difficult to inhibit the internal pressure of the alkaline storage battery 1 from increasing.

"Embodiments in the Case of Incorporating and/or Disposing Compound Containing One or More Rare Earth Elements"

It is preferred in the invention that a compound containing one or more rare earth elements (hereinafter referred to as "rare-earth compound") be incorporated in the positive active material particles and/or disposed on the surface of the positive-electrode material.

The rare-earth compound preferably is one which in X-ray diffractometry has major diffraction peaks at $d=0.88\pm0.015$ nm, $d=0.84\pm0.015$ nm, and $d=0.76\pm0.015$ nm. By the incorporation and/or disposition of a rare-earth compound, the difference between the oxygen evolution potential and oxidation potential of the nickel electrode is enlarged and, hence, the charge efficiency can be improved. Especially when a rare-earth compound having the diffraction peaks shown above is used, the improvement in charge efficiency is remarkable.

Figure 6:
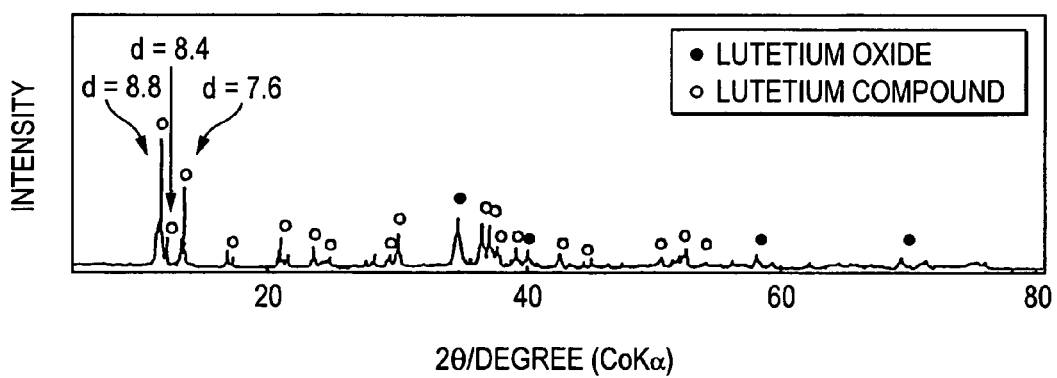
FIG. 6 is a presentation showing an X-ray diffraction pattern of lutetium oxide-lutetium compound.

Examples of the rare earth elements include Er, Tm, Yb, Lu, Y, Ho, and the like. Examples of the rare-earth compound include oxides, hydroxide, nitrates, composite oxides, and the like. Immersing any of these compounds in a high-temperature aqueous alkali solution, e.g., 30% by weight aqueous potassium hydroxide solution having a temperature of 80° C., gives the preferred "rare-earth compound having the major peaks" usable in the invention. In FIG. 6 is shown an X-ray diffraction pattern of "lutetium oxide-lutetium compound" as an example of the rare-earth compound.

In the case where a rare-earth compound is used in the invention, the proportion of this compound in the nickel electrode material is preferably from 0.1 to 20% by weight, especially preferably from 0.5 to 10% by weight. The reasons for this are as follows. In case where the proportion thereof is lower than 0.5% by weight, the oxygen evolution potential of the nickel electrode does not sufficiently shift to the nobler side and, hence, there is a possibility in high-temperature charge that the nickel electrode might have poor susceptibility to charge and a sufficient capacity cannot be obtained. In case where the proportion thereof exceeds 10% by weight, the relative amount of the nickel hydroxide is reduced and this may lead to a decrease in capacity and impaired high-rate discharge characteristics.

In the case where a rare-earth compound is incorporated and/or disposed, the desired electrode material can be produced by adding the rare-earth compound in at least one of the "oxidation treatment step" and "heat treatment step" in step (c) described above.

The rare-earth compound added should be heat-treated without fail in the "heat treatment step" even when the rare-earth compound is added in the "oxidation treatment step", not to mention in the case of adding the compound in the "heat treatment step". As a result, the rare-earth compound in the nickel electrode material obtained has improved stability in the alkaline electrolytic solution. Because of this, the rare-earth compound is inhibited from reacting with the electrolytic solution and dissolving in the electrolytic solution. Consequently, the rare-earth compound is prevented from inhibiting cobalt ion dissolution and cobalt hydroxide precipitation in the electrolytic solution. The rare-earth compound is further prevented from depositing on the negative electrode to increase the resistance of the negative electrode. Thus, the decrease in high-rate discharge characteristics attributable to the addition of a rare-earth compound is prevented and improved high-rate discharge characteristics are obtained.

Furthermore, the addition of a rare-earth compound brings about excellent high-rate charge characteristics. Namely, in the nickel electrode employing the nickel electrode material obtained, the oxygen overvoltage during charge is heightened by the action of the rare-earth compound to shift the oxygen evolution potential to the nobler side and inhibit oxygen evolution. As a result, the efficiency of nickel hydroxide oxidation is heightened.

In addition, properties after high-temperature standing in a charged state also become excellent. Namely, since a rare-earth compound has been added, the nickel electrode has a heightened oxygen overvoltage and the nickel oxyhydroxide is inhibited from undergoing self-discharge during high-temperature standing. Consequently, the positive-electrode voltage is inhibited from decreasing. In case where a decrease in positive-electrode voltage occurs, the high-order cobalt compound constituting a conductive network is exposed to a reducing atmosphere and, hence, the resistance of the network increases, resulting in a reduced coefficient of use of the positive active material. In the invention, however, the positive-electrode voltage is inhibited from decreasing and is hence kept at a potential at which the high-order cobalt compound constituting a conductive network is stably present. Consequently, the coefficient of use after high-temperature standing is improved.

As stated above, through the oxidation treatment step, the cobalt in the coating layer is sufficiently oxidized to convert the low-order cobalt compound into a high-order cobalt compound in which the cobalt has an oxidation number larger than 2, whereby a satisfactory conductive network is formed. Especially when a rare-earth compound is added in the heat treatment step, the oxidation treatment of the cobalt in the oxidation treatment step proceeds smoothly and a more satisfactory conductive network is formed. Consequently, the coefficient of use of the actual capacity of the positive active material is improved.

EXAMPLES

The invention will be explained below in detail by reference to Examples of the invention and Comparative Examples, but the invention should not be construed as being limited by the following Examples.

In the following Examples and Comparative Examples, "average oxidation number (average oxidation number of the nickel in the positive-electrode material particles and the cobalt in the coating layer)", "tap density (tap density of the positive-electrode material)", and "powder resistance (powder resistance of the nickel electrode material)" were determined by the following methods.

(Method of Determining Average Oxidation Number)

First, given amounts of positive-electrode material particles and ammonium ferrous sulfate ($Fe(NH_4)_2(SO_4)_2$) were dissolved in a 20% by volume aqueous solution of acetic acid. The resultant solution was subjected to oxidation-reduction titration with a potassium permanganate solution. From the found titration value obtained, the amount of nickel and cobalt each having a valence of 2 or higher was determined. From this value and from the total amount of the nickel and cobalt contained in the given amount of the positive-electrode material, the average oxidation number of the nickel and cobalt was determined.

(Method of Measuring Tap Density)

A given amount of electrode material particles were placed in a measuring cylinder. This measuring cylinder was repeatedly dropped from a height of about 10 cm from 100 to 200 times. Thereafter, the space (volume) which was occupied by the electrode material particles and the weight of the particles were measured to determine the tap density thereof.

(Method of Measuring Powder Resistance)

Particles to be examined were placed in a tableting machine for forming tablets having a diameter of 8 mm, and a measurement was made at room temperature while applying a pressure of 15,000 N.

Example 1

{Production of Nickel Electrode Materials}

Example 1-1

"Production of Positive Active Material"

An aqueous solution containing nickel sulfate, zinc sulfate, and cobalt sulfate in combination, an aqueous ammonium sulfate solution, and an aqueous sodium hydroxide solution were added little by little to and mixed with a reaction bath containing ammonium sulfate and sodium hydroxide and regulated so as to have a pH of 12.0±0.2 and a temperature of 45±2°, while stirring the reaction bath. Throughout this operation, the pH and temperature of the reaction bath were kept at values within those ranges. Thus, nickel hydroxide particles containing zinc hydroxide and cobalt hydroxide both incorporated therein in a solid solution state, i.e., positive active material particles, were yielded. The proportions of the nickel, zinc, and cobalt in the positive active material were regulated to 58% by weight, 3.7% by weight, and 1.2% by weight, respectively (in terms of the proportions of the metals).

"Production of Positive-Electrode Material (Coating with Cobalt Hydroxide)"

Subsequently, an aqueous solution of cobalt sulfate and an aqueous solution of sodium hydroxide were simultaneously added little by little to and mixed with a reaction bath comprising an aqueous sodium hydroxide solution having a pH regulated to 12.0±0.2 and the positive active material immersed therein, while stirring the reaction bath. Throughout this operation, the pH of the reaction bath was kept at a value within that range. Thus, a coating layer comprising cobalt hydroxide was formed on the surface of the positive active material particles. Namely, positive-electrode material particles were yielded. The proportion of the coating layer comprising cobalt hydroxide in this positive-electrode material was regulated to 7% by weight.

"Oxidation Treatment: First Step"

To 400 g of 10% by weight aqueous sodium hydroxide solution in a reaction bath were added 100 g of the positive-electrode material particles. To this mixture was added, with stirring, 45 ml of a sodium hypochlorite solution (manufactured by Wako Pure Chemical Industries, Ltd.) to conduct an oxidation treatment. The temperature of the reaction bath was kept at 60° C. and the reaction was conducted for 30 minutes. Thereafter, the positive-electrode material particles were taken out of the reaction bath, washed, and dehydrated. The washing operation may be omitted here because it will be performed also in the following step.

In the positive-electrode material which had undergone the oxidation treatment, the average oxidation number of nickel and cobalt was 2.15.

"Heat Treatment: Second Step"

Subsequently, 20 g of 30% by weight aqueous sodium hydroxide solution was added to the positive-electrode material particles which had undergone the oxidation treatment (first step). This mixture was heat-treated at 80° C. for 2 hours with stirring. Thereafter, the particles were washed with water and dried. Thus, a nickel electrode material of Example 1-1 was obtained. In the nickel electrode material of Example 1-1, the average oxidation number of nickel and cobalt was 2.15. The aqueous sodium hydroxide solution may be gradually added while heating the positive-electrode material particles.

Examples 1-2 to 1-4

The same procedure as in Example 1-1 was conducted, except that the temperature in the heat treatment (second step) was changed. Heat treatment temperatures of 100° C., 120° C., and 140° C. were used respectively in Examples 1-2, 1-3, and 1-4. In each of the nickel electrode materials of Examples 1-2 to 1-4, the average oxidation number of nickel and cobalt was 2.15.

Example 1-5

The same procedure as in Example 1-1 was conducted, except that the alkali concentration and temperature in the heat treatment (second step) were changed. Namely, 40% by weight aqueous sodium hydroxide solution was used and the temperature was changed to 120° C. This is referred to as Example 1-5. In the nickel electrode material of Example 1-5, the average oxidation number of nickel and cobalt was 2.15.

Example 1-6

The same procedure as in Example 1-1 was conducted, except that the alkali concentration in the oxidation treatment (first step) and the temperature in the heat treatment (second step) were changed. Namely, in the oxidation treatment (first step), water was used in place of the aqueous sodium hydroxide solution. The temperature in the heat treatment (second step) was changed to 120° C. This is referred to as Example 1-6. In the nickel electrode material of Example 1-6, the average oxidation number of nickel and cobalt was 2.15.

Example 1-7

The same procedure as in Example 1-1 was conducted, except that the alkali concentration in the oxidation treatment (first step) and the temperature in the heat treatment (second step) were changed. Namely, in the oxidation treatment (first step), 20% by weight aqueous sodium hydroxide solution was used. The temperature in the heat treatment (second step) was changed to 120° C. This is referred to as Example 1-7. In the nickel electrode material of Example 1-7, the average oxidation number of nickel and cobalt was 2.15.

Table 1 shows production conditions for the nickel electrode materials of Examples 1-1 to 1-7.

TABLE 1

| Example | First Step (oxidation treatment) | | | Second Step (heat treatment) | | |
| --- | --- | --- | --- | --- | --- | --- |
| | Aqueous NaOH solution (wt %) | Temperature (° C.) | Hours | Aqueous NaOH solution (wt %) | Temperature (° C.) | Hours |
| 1-1 | 10 | 60 | 0.5 | 30 | 80 | 2 |
| 1-2 | 10 | 60 | 0.5 | 30 | 100 | 2 |
| 1-3 | 10 | 60 | 0.5 | 30 | 120 | 2 |
| 1-4 | 10 | 60 | 0.5 | 30 | 140 | 2 |
| 1-5 | 10 | 60 | 0.5 | 40 | 120 | 2 |
| 1-6 | 0 | 60 | 0.5 | 30 | 120 | 2 |
| 1-7 | 20 | 60 | 0.5 | 30 | 120 | 2 |

Comparative Example 1-1

Positive-electrode material particles were obtained in the same manner as in Example 1-1. The subsequent oxidation treatment (first step) and heat treatment (second step) were omitted. The particles obtained are referred to as the nickel electrode material of Comparative Example 1-1. In the nickel electrode material of Comparative Example 1-1, the average oxidation number of nickel and cobalt was 2.00.

Comparative Example 1-2

Positive-electrode material particles were obtained in the same manner as in Example 1-1. Thereafter, an oxidation treatment (first step) only was conducted. This oxidation treatment was performed in the same manner as in the oxidation treatment in Example 1-1, except that water was used in place of the aqueous sodium hydroxide solution. This is referred to as Comparative Example 1-2. In the nickel electrode material of Comparative Example 1-2, the average oxidation number of nickel and cobalt was 2.15.

Comparative Example 1-3 to 1-6

Positive-electrode material particles were obtained in the same manner as in Example 1-1. Thereafter, an oxidation treatment (first step) only was conducted. This oxidation treatment was performed in the same manner as in the oxidation treatment in Example 1-1, except that the concentration of the aqueous sodium hydroxide solution was changed. The concentration was changed to 5% by weight, 10% by weight, 20% by weight, and 30% by weight in Comparative Examples 1-3, 1-4, 1-5, and 1-6, respectively. In each of the nickel electrode materials of Comparative Examples 1-3 to 1-6, the average oxidation number of nickel and cobalt was 2.15.

Comparative Examples 1-7 and 1-8

Positive-electrode material particles were obtained in the same manner as in Example 1-1. Thereafter, an oxidation treatment (first step) only was conducted. This oxidation treatment was performed in the same manner as in the oxidation treatment in Example 1-1, except that the concentration and temperature of the aqueous sodium hydroxide solution were changed. In Comparative Example 1-7, a concentration of 30% by weight and a temperature of 80° C. were used. In Comparative Example 1-8, a concentration of 30% by weight and a temperature of 100° C. were used. In each of the nickel electrode materials of Comparative Examples 1-7 and 1-8, the average oxidation number of nickel and cobalt was 2.15.

Comparative Examples 1-9 to 1-12

The same procedure as in Example 1-1 was conducted, except that at least one of the alkali concentration and the temperature in the heat treatment (second step) was changed. Namely, in Comparative Example 1-9, the same alkali concentration and a temperature of 40° C. were used. In Comparative Example 1-10, the same alkali concentration and a temperature of 60° C. were used. In Comparative Example 1-11, 10% by weight aqueous sodium hydroxide solution and a temperature of 120° C. were used. In Comparative Example 1-12, 20% by weight aqueous sodium hydroxide solution and a temperature of 120° C. were used. In each of the nickel electrode materials of Comparative Examples 1-9 to 1-12, the average oxidation number of nickel and cobalt was 2.15.

Table 2 shows production conditions for the nickel electrode materials of Comparative Examples 1-1 to 1-12.

TABLE 2

| Comparative Example | First Step (oxidation treatment) | | | Second Step (heat treatment) | | |
|---|---|---|---|---|---|---|
| | Aqueous NaOH solution (wt %) | Temperature (° C.) | Hours | Aqueous NaOH solution (wt %) | Temperature (° C.) | Hours |
| 1-1 | — | — | — | — | — | — |
| 1-2 | 0 | 60 | 0.5 | — | — | — |
| 1-3 | 5 | 60 | 0.5 | — | — | — |
| 1-4 | 10 | 60 | 0.5 | — | — | — |
| 1-5 | 20 | 60 | 0.5 | — | — | — |
| 1-6 | 30 | 60 | 0.5 | — | — | — |
| 1-7 | 30 | 80 | 0.5 | — | — | — |
| 1-8 | 30 | 100 | 0.5 | — | — | — |
| 1-10 | 10 | 60 | 0.5 | 30 | 40 | 2 |
| 1-11 | 10 | 60 | 0.5 | 30 | 60 | 2 |
| 1-12 | 10 | 60 | 0.5 | 10 | 120 | 2 |
| 1-13 | 10 | 60 | 0.5 | 20 | 120 | 2 |

{Production of Nickel Electrodes}

A nickel electrode material, 0.6% by weight CMC (carboxymethyl cellulose) solution, and 40% by weight PTFE (polytetrafluoroethylene) were mixed together in a ratio of 76.7:22.9:0.4 by weight to obtain an electrode material paste. A porous cellular nickel substrate was impregnated with the electrode material paste, subsequently dried, and then rolled to produce a nickel electrode having an electrode material impregnation density of 2.6 g/cc and a positive-electrode capacity of 1,450 mAh (theoretical capacity of the nickel hydroxide was regarded as 289 mAh/g).

As the nickel electrode material was used each of the nickel electrode materials of Examples 1-1, 1-3, 1-6, and 1-7 and Comparative Examples 1-1, 1-2, and 1-7. In the case of the nickel electrode material of Comparative Example 1-7, however, impregnation with the given amount of the electrode material was difficult because of a considerable decrease in tap density, resulting in a positive-electrode capacity of 1,250 mAh.

{Production of Alkaline Storage Batteries}

A nickel electrode and a negative electrode comprising as the main material a hydrogen-absorbing alloy represented by the composite formula $Mm_{1.0}Ni_{4.0}Co_{0.7}Mn_{0.3}Al_{0.3}$ were spirally wound through a nonwoven polypropylene fabric having a thickness of 100 μm and inserted into a battery case. An electrolytic solution comprising an aqueous solution of both potassium hydroxide and lithium hydroxide was injected into the case, which was then sealed. Thus, an AA-size nickel/metal-hydride storage battery having a theoretical capacity of 1,450 mAh was produced.

As the nickel electrode was used each of the nickel electrodes produced by the method described above from the nickel electrode materials of Examples 1-1, 1-3, 1-6, and 1-7 and Comparative Examples 1-1, 1-2, and 1-7. However, the battery employing the nickel electrode material of Comparative Example 1-7 had a capacity of 1,250 mAh.

{Evaluation of Nickel Electrode Materials}

The nickel electrode materials of Examples 1-1 to 1-7 and Comparative Examples 1-1 to 1-12 were examined for tap density and powder resistance. The results thereof are shown in Table 3 and Table 4. In Tables 3 and 4, values of "average oxidation number (average oxidation number of the nickel in the positive-electrode material particles and the cobalt in the coating layer)" are also shown.

TABLE 3

| Example | Average oxidation number | Tap density (g/cm³) | Powder resistance (Ωcm) |
|---|---|---|---|
| 1-1 | 2.15 | 2.2 | 15 |
| 1-2 | 2.15 | 2.2 | 10 |
| 1-3 | 2.15 | 2.2 | 8 |
| 1-4 | 2.15 | 2.18 | 6 |
| 1-5 | 2.15 | 2.2 | 10 |
| 1-6 | 2.15 | 2.2 | 7 |
| 1-7 | 2.15 | 2.18 | 7 |

TABLE 4

| Comparative Example | Average oxidation number | Tap density (g/cm³) | Powder resistance (Ωcm) |
|---|---|---|---|
| 1-1 | 2.00 | 2.2 | — |
| 1-2 | 2.15 | 2.2 | 3400 |
| 1-3 | 2.15 | 2.2 | 1300 |
| 1-4 | 2.15 | 2.2 | 670 |
| 1-5 | 2.15 | 2.18 | 300 |
| 1-6 | 2.15 | 1.98 | 29 |

TABLE 4-continued

| Comparative Example | Average oxidation number | Tap density (g/cm³) | Powder resistance (Ωcm) |
|---|---|---|---|
| 1-7 | 2.15 | 1.87 | 5 |
| 1-8 | 2.15 | 1.76 | 4 |
| 1-9 | 2.15 | 2.2 | 520 |
| 1-10 | 2.15 | 2.2 | 80 |
| 1-11 | 2.15 | 2.2 | 1100 |
| 1-12 | 2.15 | 2.2 | 88 |

The nickel electrode material of Comparative Example 1-1 is a positive-electrode material which has undergone neither an oxidation treatment nor a heat treatment and is an insulator of 10 Mcncm or higher. In Comparative Example 1-2, the sodium hydroxide concentration of 0% by weight means water.

(Investigation on Oxidation Treatment Conditions)

As can be seen from Comparative Examples 1-2 to 1-6, powder resistance decreased with increasing alkali concentration. However, the alkali concentration elevated to 30% by weight resulted in an abruptly reduced tap density. Furthermore, as can be seen from Comparative Examples 1-6 to 1-8, the temperatures exceeding 60° C. resulted in a further reduced powder resistance and a further reduced tap density. It can hence be seen that nickel electrode materials which have undergone no decrease in tap density are obtained when the oxidation treatment conditions include a temperature of 60° C. or lower and an alkali concentration of 20% by weight or lower. It is thought that an oxidation treatment conducted at a temperature higher than 60° C. and an alkali concentration higher than 20% by weight results in an increase in intraparticulate pore volume or generation of γ-NiOOH, and this is causative of a decrease in tap density.

(Investigation on Heat Treatment Conditions)

In Examples 1-1 to 1-7, oxidation treatments were conducted under such conditions as not to result in a decrease in tap density. In the heat treatments in Examples 1-1 to 1-4, an alkali concentration of 30% by weight and a temperature of 80° C. or higher were used to obtain satisfactory values of powder resistance. In contrast, heat treatment temperatures of 40° C. and 60° C. were used in Comparative Example 1-9 and Comparative Example 1-10, respectively, resulting in a large value of powder resistance in each case. Consequently, heat treatment temperatures of 80° C. and higher are effective.

In Example 1-5, an alkali concentration of 40% by weight was used to obtain a satisfactory value of powder resistance. In contrast, alkali concentrations of 10% by weight and 20% by weight were used in Comparative Example 1-11 and Comparative Example 1-12, respectively, resulting in a large value of powder resistance in each case. Namely, the powder resistance in Comparative Example 1-11 is high and the powder resistance in Comparative Example 1-12 is slightly high. Consequently, alkali concentrations of 30% by weight and higher are effective in the heat treatment. In particular, the alkali concentration and temperature conditions used in Examples 1-3, 1-4, 1-6, and 1-7 are optimal. Furthermore, such heat treatment conditions result in almost no decrease in tap density. This may be because oxidation of the nickel hydroxide does not occur in such heat treatments.

{Evaluation of Alkaline Storage Batteries}

The coefficient of use of actual capacity, coefficient of use in high-rate discharge, internal battery pressure, and recovered coefficient of use after over discharge were determined in order to evaluate battery performances. The results thereof are shown in Table 5.

TABLE 5

| Alkaline storage battery | Coefficient of use in actual capacity (%) | Coefficient of use in high-rate discharge (%) | Internal pressure (MPa) | Recovered coefficient of use after over discharge (%) |
|---|---|---|---|---|
| Example 1-1 | 100 | 88 | 0.3 | 100 |
| Example 1-3 | 100 | 89 | 0.3 | 100 |
| Example 1-6 | 100 | 90 | 0.3 | 100 |
| Example 1-7 | 100 | 90 | 0.3 | 100 |
| Comparative Example 1-1 | 100 | 90 | 0.7 | 83 |
| Comparative Example 1-2 | 92 | 55 | 0.8 | 81 |
| Comparative Example 1-7 | 86 | 65 | 1.1 | 86 |

(Coefficient of Use of Actual Capacity)

The nickel/metal-hydride storage batteries produced by the method described above each were examined to determine the coefficient of use of actual capacity in the following manner.

Namely, in a 20° C. atmosphere, the battery was charged at a charge current of 145 mA (0.1 ItA) for 15 hours, subsequently paused for 1 hour, and then discharged at 290 mA (0.2 ItA). The discharge was terminated when the battery voltage reached 1.0 V. The discharge capacity in this operation was determined. From the battery capacity of 1,450 mAh and from the found value of discharge capacity, the coefficient of use of actual capacity was determined using the following equation (I). The coefficients of use of actual capacity shown in Table 5 are values determined after several repetitions of the charge and discharge.

(Coefficient of use of actual capacity)=(discharge capacity in 0.2-ItA discharge)÷1,450×100   equation (I)

(Coefficient of Use in High-Rate Discharge)

After the determination of the coefficient of use of actual capacity, the coefficient of use in high-rate discharge was determined in the following manner.

Namely, in a 20° C. atmosphere, the battery was charged at a charge current of 145 mA (0.1 ItA) for 15 hours, subsequently paused for 1 hour, and then discharged at 4,350 mA (3 ItA). The discharge was terminated when the battery voltage reached 1.0 V. The discharge capacity in this operation was determined. From the battery capacity of 1,450 mAh and from the found value of discharge capacity, the coefficient of use in high-rate discharge was determined using the following equation (II).

(Coefficient of use in high-rate discharge)=(discharge capacity in 3-ItA discharge)÷1,450×100   equation (II)

As Table 5 shows, the batteries employing the nickel electrode materials of Comparative Examples 1-2 and 1-7 suffered a decrease in the coefficient of use of actual capacity. In particular, in the battery employing the nickel electrode material of Comparative Example 1-2, the electrode material has a significantly high powder resistance and the cobalt compound is thought not to be sufficiently functioning as a conductive network. In the battery employing the nickel electrode material of Comparative Example 1-7, the positive electrode has not been impregnated with the necessary amount of the electrode material because of the reduced tap density of the electrode material. Although determining the proportion of the discharge capacity to the battery capacity of 1,450 mAh as the coefficient of use may be improper, the problem is that the actual battery has a reduced capacity.

The nickel electrode material of Comparative Example 1-1 has undergone no oxidation treatment. Because of this, in the battery employing the nickel electrode material of Comparative Example 1-1, the cobalt hydroxide in the nickel electrode material dissolves in the electrolytic solution, thereafter reprecipitates so as to connect particles to one another, and changes into a conductive cobalt compound upon first charge to form an excellent conductive network. Consequently, the battery employing the nickel electrode material of Comparative Example 1-1 attained an excellent coefficient of use even in high-rate discharge.

The nickel electrode materials of Examples 1-1, 1-3, 1-6, and 1-7 are free from the dissolution/reprecipitation of the cobalt compound in batteries because they have undergone an oxidation treatment like the nickel electrode materials of the Comparative Examples other than Comparative Example 1-1. The batteries employing the nickel electrode materials of Examples 1-1, 1-3, 1-6, and 1-7 have attained the same coefficient of use in high-rate discharge as in Comparative Example 1-1, although the contact resistance among the positive active material particles therein is expected to be higher than in the battery employing the nickel electrode material of Comparative Example 1-1. This is thought to be because the nickel electrode materials of Examples 1-1, 1-3, 1-6, and 1-7 have attained a sufficiently low powder resistance due to the heat treatment conducted after the oxidation treatment in the production thereof.

(Internal Battery Pressure)

An internal-pressure measuring sensor for batteries was attached to the nickel/metal-hydride storage batteries produced by the method described above, and the internal pressure during charge at a charge current of 1,450 mA (1 ItA) was measured. The internal pressures shown in Table 5 are values obtained after 1.5-hour charge.

The difference in internal pressure between the batteries employing the nickel electrode materials of Examples 1-1, 1-3, 1-6, and 1-7 and the battery employing the nickel electrode material of Comparative Example 1-1 is attributable to a difference in discharge reserve amount generated in the negative electrode. In the final stage of charge of a battery, oxygen gas evolution and hydrogen gas evolution occur at the positive electrode and the negative electrode, respectively, to elevate the internal pressure of the battery. The hydrogen gas evolution at the negative electrode is influenced by the charge reserve amount of the negative electrode; hydrogen gas is apt to generate when the charge reserve amount is small. Causes of a decrease in charge reserve amount include the generation of discharge reserve. In the battery employing the nickel electrode material of Comparative Example 1-1, a large amount of discharge reserve generates with the irreversible capacity of the positive electrode and the corrosion of the negative-electrode alloy. However, in the nickel electrode materials of Examples 1-1, 1-3, 1-6, and 1-7, a reduction of discharge reserve in an amount corresponding to the discharge reserve generation to be caused by the irreversible capacity of the positive electrode and by the corrosion of the negative-electrode alloy can be attained by the heat treatment.

Consequently, the batteries employing these nickel electrode materials have a larger charge reserve amount than the battery employing the nickel electrode material of Comparative Example 1-1. Thus, the difference in charge reserve amount has resulted in the difference in internal battery pressure.

(Recovered Coefficient of Use after Over Discharge)

The nickel/metal-hydride storage batteries produced by the method described above were examined to determine the recovered coefficient of use after over discharge.

The over discharge of each battery was conducted in the following manner. Namely, a cycle consisting of 0.1-ItA charge and 0.2 ItA discharge was repeated several times. Thereafter, the battery in a discharged state was externally short-circuited through a 4-Ω resistor and allowed to stand in a 60° C. atmosphere for 3 days.

The recovered coefficient of use was determined in the following manner. Namely, the resistor was removed from the battery in an over-discharge state. In a 20° C. atmosphere, this battery was charged at a charge current of 145 mA (0.1 ItA) for 15 hours, subsequently paused for 1 hour, and then discharged at 290 mA (0.2 ItA). The discharge was terminated when the battery voltage reached 1.0 V. The discharge capacity in this operation was determined. From the battery capacity of 1,450 mAh and from the found value of discharge capacity, the recovered coefficient of use after over discharge was determined using the following equation (III).

(Recovered coefficient of use after over discharge)= (discharge capacity after over discharge)÷1,450× 100     equation (III)

In the batteries employing the nickel electrode materials of Examples 1-1, 1-3, 1-6, and 1-7, no decrease in the coefficient of use through the over discharge was observed. The reason for this is thought to be that in each of the nickel electrode materials of Examples 1-1, 1-3, 1-6, and 1-7, a cobalt compound having low resistance and a stable structure had been yielded by the heat treatment during the production thereof.

In the over discharge of batteries, the positive-electrode potential approaches the negative-electrode potential and the battery voltage becomes almost 0 V. At the negative-electrode potential, the cobalt compound in the positive electrode changes into a cobalt compound having high resistance. This is thought to be causative of the decrease in the coefficient of use through over discharge in the batteries employing the nickel electrode materials of Comparative Examples 1-1 and 1-2.

With respect to the aqueous alkali solutions used in producing the nickel electrode materials described above, lithium hydroxide or potassium hydroxide may be employed in place of sodium hydroxide because alkali concentration considerably influences a decrease in the powder resistance of the electrode materials. However, use of lithium hydroxide alone is not effective because it does not dissolve in water in a high concentration.

Example 2

{Production of Nickel Electrode Materials}

Example 2-1

"Production of Positive Active Material"

A positive active material was synthesized by the ammine complex salt method in the following manner. An aqueous solution containing nickel sulfate, zinc sulfate, and cobalt sulfate in combination and an aqueous ammonium sulfate solution were simultaneously and continuously added little by little to and mixed with an alkaline aqueous solution having a pH regulated to 12.0±0.2, while stirring the alkaline solution. During this operation, an appropriate amount of an aqueous sodium hydroxide solution was dropped into the reaction bath to keep the pH of the reaction bath in the 12.0±0.2 range. Furthermore, the temperature of the reaction bath during the mixing operation was kept at 45±2° C. Thus, nickel hydroxide solid solution particles containing zinc and cobalt both incorporated therein in a solid solution state, i.e., positive active material particles, were yielded. The proportions of the nickel, zinc, and cobalt in the positive active material were regulated to 58% by weight, 3.7% by weight, and 1.2% by weight, respectively, in terms of the proportions of the metals.

"Production of Positive-Electrode Material (Formation of Cobalt Hydroxide Coating Layer)"

Subsequently, the positive active material particles were dispersed in an alkaline aqueous solution having a pH regulated to 12.0±0.2. An aqueous cobalt sulfate solution and an aqueous sodium hydroxide solution were simultaneously and continuously added little by little to the dispersion while stirring the dispersion. Throughout this operation, the pH of the reaction bath was kept at 12.0±0.2 by regulating the rate of addition of the sodium hydroxide. Thus, a coating layer comprising cobalt hydroxide was formed on the surface of the positive active material particles. Namely, positive-electrode material particles were yielded. The proportion of the coating layer comprising cobalt hydroxide in this positive-electrode material was regulated to 7% by weight.

In X-ray diffractometry, the nickel hydroxide in the positive-electrode material obtained had a peak intensity ratio (100)/(001) of 0.60, a peak intensity ratio (101)/(001) of 0.60, and a half width of the peak for the (101) plane of 1.1 degree.

"Oxidation Treatment: First Step"

An oxidation treatment was conducted in the same manner as in Example 1-1. Thereafter, the positive-electrode material particles were taken out of the reaction bath, washed, and dehydrated. In the positive-electrode material which had undergone this oxidation treatment, the average oxidation number of nickel and cobalt was 2.15.

"Heat Treatment: Second Step"

A heat treatment was conducted in the same manner as in Example 1-1, except that the treatment was performed "at 80° C. for 30 minutes". Thus, a nickel electrode material of Example 2-1 was obtained. In the nickel electrode material of Example 2-1, the average oxidation number of nickel and cobalt was 2.15.

In X-ray diffractometry, the nickel hydroxide in the nickel electrode material obtained had a peak intensity ratio (100)/(001) of 0.60, a peak intensity ratio (101)/(001) of 0.60, and a half width of the peak for the (101) plane of from 1.0 to 1.1 degree.

{Production of Nickel Electrode}

A nickel electrode (theoretical capacity of the nickel hydroxide was regarded as 289 mAh/g) was produced by the same method as in Example 1.

{Production of Alkaline Storage Battery}

An AA-size nickel/metal-hydride storage battery having a theoretical capacity of 1,450 mAh was produced by the same method as in Example 1.

Example 2-2

A nickel electrode material was obtained in the same manner as in Example 2-1, except that the treatment period in the heat treatment (second step) in Example 2-1 was changed to 5 hours. Furthermore, a nickel electrode and a nickel/metal-hydride storage battery were produced in the same manner as in Example 2-1.

In the nickel electrode material of Example 2-2 obtained, the average oxidation number of nickel and cobalt was 2.15. In X-ray diffractometry, the nickel hydroxide in the nickel electrode material of Example 2-2 had a peak intensity ratio (100)/(001) of 0.50, a peak intensity ratio (101)/(001) of 0.50, and a half width of the peak for the (101) plane of 0.9 degrees.

Example 2-3

A nickel electrode material was obtained in the same manner as in Example 2-1, except that the treatment period in the heat treatment (second step) in Example 2-1 was changed to 10 hours. Furthermore, a nickel electrode and a nickel/metal-hydride storage battery were produced in the same manner as in Example 2-1.

In the nickel electrode material of Example 2-3 obtained, the average oxidation number of nickel and cobalt was 2.15. In X-ray diffractometry, the nickel hydroxide in the nickel electrode material of Example 2-3 had a peak intensity ratio (100)/(001) of 0.50, a peak intensity ratio (101)/(001) of 0.50, and a half width of the peak for the (101) plane of 0.9 degrees.

Example 2-4

A nickel electrode material was obtained in the same manner as in Example 2-1, except that the treatment temperature and treatment period in the heat treatment (second step) in Example 2-1 were changed to 120° C. and 1 hour, respectively. Furthermore, a nickel electrode and a nickel/metal-hydride storage battery were produced in the same manner as in Example 2-1.

In the nickel electrode material of Example 2-4 obtained, the average oxidation number of nickel and cobalt was 2.15. In X-ray diffractometry, the nickel hydroxide in the nickel electrode material of Example 2-4 had a peak intensity ratio (100)/(001) of 0.55, a peak intensity ratio (101)/(001) of 0.55, and a half width of the peak for the (101) plane of 1.0 degree.

Reference Example 2-1

A nickel electrode material was obtained in the same manner as in Example 2-1, except that the treatment period in the heat treatment step in Example 2-1 was changed to 16 hours. Furthermore, a nickel electrode and a nickel/metal-hydride storage battery were produced in the same manner as in Example 2-1.

In the nickel electrode material of Reference Example 2-1 obtained, the average oxidation number of nickel and cobalt was 2.15. In X-ray diffractometry, the nickel hydroxide in the nickel electrode material of Reference Example 2-1 had a peak intensity ratio (100)/(001) of 0.47, a peak intensity ratio (101)/(001) of 0.47, and a half width of the peak for the (101) plane of 0.8 degrees.

Table 6 shows production conditions for each of the nickel electrode materials of Examples 2-1 to 2-4 and Reference Example 2-1.

TABLE 6

| | First Step (oxidation treatment) | | | Second Step (heat treatment) | | |
|---|---|---|---|---|---|---|
| | Aqueous NaOH solution (wt %) | Temperature (° C.) | Hours | Aqueous NaOH solution (wt %) | Temperature (° C.) | Hours |
| Example 2-1 | 10 | 60 | 0.5 | 30 | 80 | 0.5 |
| Example 2-2 | 10 | 60 | 0.5 | 30 | 80 | 5 |
| Example 2-3 | 10 | 60 | 0.5 | 30 | 80 | 10 |
| Example 2-4 | 10 | 60 | 0.5 | 30 | 120 | 1 |
| Reference Example 2-1 | 10 | 60 | 0.5 | 30 | 80 | 16 |

{Evaluation}

The nickel electrode materials of Examples 2-1 to 2-4 and Reference Example 2-1 were examined for tap density and powder resistance. The results thereof are shown in Table 7 (1). In Table 7 are also shown "average oxidation number: average oxidation number of the nickel in the positive-electrode material particles and the cobalt in the coating layer", "peak intensity ratios: (100)/(001) and (101)/(001)", and "half width: half width of the peak for the (101) plane".

TABLE 7 (1)

| | Average oxidation number | Tap density (g/cm³) | Powder resistance (Ωcm) | Peak intensity ratio (100)/(001) | Peak intensity ratio (101)/(001) | Half width for (101) plane |
|---|---|---|---|---|---|---|
| Example 2-1 | 2.15 | 2.20 | 20 | 0.60 | 0.60 | 1.0-1.1 |
| Example 2-2 | 2.15 | 2.20 | 21 | 0.50 | 0.50 | 0.9 |
| Example 2-3 | 2.15 | 2.20 | 19 | 0.50 | 0.50 | 0.9 |
| Example 2-4 | 2.15 | 2.20 | 28 | 0.55 | 0.55 | 1.0 |
| Reference Example 2-1 | 2.15 | 2.21 | 16 | 0.47 | 0.47 | 0.8 |

{Coefficient of Use of Actual Capacity}

The nickel/metal-hydride storage batteries of Examples 2-1 to 2-4 and Reference Example 2-1 were examined to determine the coefficient of use of actual capacity by the same method as the measuring method described in Example 1. The results thereof are shown in Table 7 (2). Table 7 (2) shows that the batteries of Examples 2-1 to 2-4 had a coefficient of use of actual capacity of 100%, while the battery of Reference Example 2-1 had a coefficient of use of actual capacity of 95%.

TABLE 7 (2)

| | Coefficient of use in 0.2-ItA discharge |
|---|---|
| Example 2-1 | 100 |
| Example 2-2 | 100 |
| Example 2-3 | 100 |
| Example 2-4 | 100 |
| Reference Example 2-1 | 95 |

Example 3

{Production of Nickel Electrode Materials}

Example 3-1

"Production of Positive Active Material"

A positive active material containing cobalt and zinc in a solid solution state was produced by the same method as that described in Example 2-1. The proportions of the cobalt and zinc incorporated in a solid solution state were regulated to 0.5% by weight and 3.5% by weight, respectively, in terms of the proportions of the metals.

"Production of Positive-Electrode Material"

A coating layer of cobalt hydroxide was formed on the surface of the positive active material by the same method as that described in Example 2-1. Thus, a positive-electrode material was produced. The proportion of all cobalt in this positive-electrode material was regulated to 4.0% by weight in terms of the proportion of the metal.

The term proportion as used here means the value based on the weight of the positive active material and coating layer (the weight excludes that of any ingredient other than the components of the positive-electrode material, such as, e.g., an electrolytic solution).

"Oxidation Treatment: First Step"

An oxidation treatment was conducted by the same method as that described in Example 2-1. After the oxidation treatment, the nickel and cobalt had an average oxidation number of 2.15.

"Heat Treatment: Second Step"

A heat treatment was conducted by the same method as in Example 2-1 to obtain a nickel electrode material. The nickel and cobalt in this nickel electrode material had an average oxidation number of 2.15.

{Production of Nickel Electrode}

A nickel electrode was produced by the same method as in Example 2-1.

{Production of Alkaline Storage Battery}

An AA-size nickel/metal-hydride battery having a theoretical capacity of 1,450 mAh was produced by the same method as in Example 2-1.

Example 3-2

The same procedure as in Example 3-1 was conducted, except that the proportions of the cobalt and zinc incorporated in a solid solution state into the positive active material were regulated to 1.5% by weight and 3.5% by weight, respectively, in terms of the proportions of the metals, and that the proportion of all cobalt in the positive-electrode material was regulated to 5.5% by weight in terms of the proportion of the metal. (Average oxidation number of nickel and cobalt in the positive-electrode material: 2.15)

Example 3-3

The same procedure as in Example 3-1 was conducted, except that the proportions of the cobalt and zinc incorporated in a solid solution state into the positive active material were regulated to 4.0% by weight and 3.5% by weight, respectively, in terms of the proportions of the metals, and that the proportion of all cobalt in the positive-electrode material was regulated to 8.0% by weight in terms of the proportion of the metal. (Average oxidation number of nickel and cobalt in the positive-electrode material: 2.15)

Example 3-4

The same procedure as in Example 3-1 was conducted, except that the proportions of the cobalt and zinc incorporated in a solid solution state into the positive active material were regulated to 1.5% by weight and 1.0% by weight, respectively, in terms of the proportions of the metals, and that the proportion of all cobalt in the positive-electrode material was regulated to 5.5% by weight in terms of the proportion of the metal. (Average oxidation number of nickel and cobalt in the positive-electrode material: 2.15)

Example 3-5

The same procedure as in Example 3-1 was conducted, except that the proportions of the cobalt and zinc incorporated in a solid solution state into the positive active material were regulated to 1.5% by weight and 5.0% by weight, respectively, in terms of the proportions of the metals, and that the proportion of all cobalt in the positive-electrode material was regulated to 5.5% by weight in terms of the proportion of the metal. (Average oxidation number of nickel and cobalt in the positive-electrode material: 2.15)

Example 3-6

The same procedure as in Example 3-1 was conducted, except that the proportions of the cobalt and zinc incorporated in a solid solution state into the positive active material were regulated to 1.5% by weight and 3.5% by weight, respectively, in terms of the proportions of the metals, and that the proportion of all cobalt in the positive-electrode material was regulated to 2.5% by weight in terms of the proportion of the metal. (Average oxidation number of nickel and cobalt in the positive-electrode material: 2.15)

Example 3-7

The same procedure as in Example 3-1 was conducted, except that the proportions of the cobalt and zinc incorporated in a solid solution state into the positive active material were regulated to 0.5% by weight and 3.5% by weight, respectively, in terms of the proportions of the metals, and that the proportion of all cobalt in the positive-electrode material was regulated to 3.0% by weight in terms of the proportion of the metal. (Average oxidation number of nickel and cobalt in the positive-electrode material: 2.15)

Example 3-8

The same procedure as in Example 3-1 was conducted, except that the proportions of the cobalt and zinc incorporated in a solid solution state into the positive active material were regulated to 1.5% by weight and 3.5% by weight, respectively, in terms of the proportions of the metals, that the proportion of all cobalt in the positive-electrode material was regulated to 5.5% by weight in terms of the proportion of the metal, and that the average oxidation number of the nickel and cobalt in the positive-electrode material was regulated to 2.04.

Example 3-9

The same procedure as in Example 3-1 was conducted, except that the proportions of the cobalt and zinc incorporated in a solid solution state into the positive active material were regulated to 1.5% by weight and 3.5% by weight, respectively, in terms of the proportions of the metals, that the proportion of all cobalt in the positive-electrode material was regulated to 5.5% by weight in terms of the proportion of the metal, and that the average oxidation number of the-nickel and cobalt in the positive-electrode material was regulated to 2.4.

Reference Example 3-1

The same procedure as in Example 3-1 was conducted, except that the proportions of the cobalt and zinc incorporated in a solid solution state into the positive active material were regulated to 6.0% by weight and 3.5% by weight, respectively, in terms of the proportions of the metals, and that the proportion of all cobalt in the positive-electrode material was regulated to 10.0% by weight in terms of the proportion of the metal. (Average oxidation number of nickel and cobalt in the positive-electrode material: 2.15)

Reference Example 3-2

The same procedure as in Example 3-1 was conducted, except that the proportions of the cobalt and zinc incorporated in a solid solution state into the positive active material were regulated to 1.5% by weight and 0% by weight, respectively, in terms of the proportions of the metals, and that the proportion of all cobalt in the positive-electrode material was regulated to 5.5% by weight in terms of the proportion of the metal. (Average oxidation number of nickel and cobalt in the positive-electrode material: 2.15)

Reference Example 3-3

The same procedure as in Example 3-1 was conducted, except that the proportions of the cobalt and zinc incorporated in a solid solution state into the positive active material were regulated to 1.5% by weight and 7.0% by weight, respectively, in terms of the proportions of the metals, and that the proportion of all cobalt in the positive-electrode material was regulated to 5.5% by weight in terms of the proportion of the metal. (Average oxidation number of nickel and cobalt in the positive-electrode material: 2.15)

Reference Example 3-4

The same procedure as in Example 3-1 was conducted, except that the proportions of the cobalt and zinc incorporated in a solid solution state into the positive active material were regulated to 1.5% by weight and 3.5% by weight, respectively, in terms of the proportions of the metals, and that the proportion of all cobalt in the positive-electrode material was regulated to 11.0% by weight in terms of the proportion of the metal. (Average oxidation number of nickel and cobalt in the positive-electrode material: 2.15)

Comparative Example 3-1

The same procedure as in Example 3-1 was conducted, except that the proportions of the cobalt and zinc incorporated in a solid solution state into the positive active material were regulated to 1.5% by weight and 3.5% by weight, respectively, in terms of the proportions of the metals, that the proportion of all cobalt in the positive-electrode material was regulated to 5.5% by weight in terms of the proportion of the metal, and that the average oxidation number of the nickel and cobalt in the positive-electrode material was regulated to 2.0.

Comparative Example 3-2

The same procedure as in Example 3-1 was conducted, except that the proportions of the cobalt and zinc incorporated in a solid solution state into the positive active material were regulated to 1.5% by weight and 3.5% by weight, respectively, in terms of the proportions of the metals, that the proportion of all cobalt in the positive-electrode material was regulated to 5.5% by weight in terms of the proportion of the metal, and that the average oxidation number of the nickel and cobalt in the positive-electrode material was regulated to 2.5.

{Evaluation}

(Determination of Coefficient of Use of Actual Capacity)

The nickel electrode materials of Examples 3-1 to 3-9, Reference Examples 3-1 to 3-4, and Comparative Examples 3-1 and 3-2 were examined to determine the coefficient of use of actual capacity by the same method as the measuring method described in Example 1. The results thereof are shown in Table 8. With respect to the "coefficient of use of actual capacity (%)" shown in Table 8, the value for Example 3-2 is taken as "100%", and the values for the other Examples and for the Reference Examples and Comparative Examples are shown in terms of proportion to the value for Example 3-2. (In Table 8 are also shown the "average oxidation number: average oxidation number of the nickel in the positive-electrode material particles and the cobalt in the coating layer", "amount of Co in solution: amount of cobalt incorporated in a solid solution state into the positive active material (in terms of metal amount)", "amount of Zn in solution: amount of zinc incorporated in a solid solution state into the positive active material (in terms of metal amount)", and "proportion of all Co: proportion of all cobalt in the positive-electrode material" for each nickel electrode material.)

(Determination of Discharge Reserve Amount)

The batteries of Example 3-2, Example 3-8, Example 3-9, Comparative Example 3-1, and Comparative Example 3-2 were examined to determine the discharge reserve amount. The discharge reserve amount was determined by the following method.

At a temperature of 20° C., charge/discharge was repeated by repeatedly conducting "a cycle" consisting of "120% charge at 1 ItA and discharge at 1 ItA to a final voltage of 1.0 V". After "ten cycles" of charge/discharge were conducted under these conditions, the battery was discharged at 0.2 ItA to a final voltage of 1.0 V. After the discharge, the battery was disassembled, and the negative electrode recovered was placed in a sealed beaker filled with distilled water. This beaker was heated with a water bath to measure the amount of the hydrogen remaining in the negative electrode. The hydrogen amount obtained was converted to quantity of electricity. The proportion of this converted value to the theoretical capacity of the positive electrode was taken as "discharge reserve amount (%)". The results are shown in Table 8.

(Types of Negative-Electrode Alloys)

In Examples 3-1 to 3-9, Reference Examples 3-1 to 3-4, and Comparative Examples 3-1 and 3-2, negative-electrode alloys having the following compositions were used. The alloy types used are shown in Table 8.

Negative-Electrode Alloy Type "A":

Hydrogen-absorbing alloy represented by composite formula "$Mm_{1.0}Ni_{4.0}Co_{0.7}Mn_{0.3}Al_{0.3}$", which is reduced in the amount of discharge reserve generated by corrosion and has excellent durability.

Negative-Electrode Alloy Type "B":

Hydrogen-absorbing alloy represented by the composite formula "$Mm_{1.0}Ni_{4.3}Mn_{0.4}Al_{0.3}$", which differs in composition from type A and which has lower corrosion resistance and higher susceptibility to size reduction than type A although superior in activity.

TABLE 8

|  | Average oxidation number | Amount of Co in solid solution | Amount of Zn in solid solution | Proportion of all Co | Coefficient of use of actual capacity (%) | Discharge reserve amount (%) | Type of negative electrode alloy | Remarks |
|---|---|---|---|---|---|---|---|---|
| Example 3-1 | 2.15 | 0.5 | 3.5 | 4.0 | 99 | — | A | — |
| Example 3-2 | 2.15 | 1.5 | 3.5 | 5.5 | 100 | 5 | A | — |
| Example 3-3 | 2.15 | 4.0 | 3.5 | 8.0 | 100 | — | A | — |
| Example 3-4 | 2.15 | 1.5 | 1.0 | 5.5 | 100 | — | A | — |
| Example 3-5 | 2.15 | 1.5 | 5.0 | 5.5 | 98 | — | A | — |
| Example 3-6 | 2.15 | 1.5 | 3.5 | 2.5 | 95 | — | A | — |
| Example 3-7 | 2.15 | 0.5 | 3.5 | 3.0 | 98 | — | A | — |
| Example 3-8 | 2.04 | 1.5 | 3.5 | 5.5 | 100 | 15 | A | — |
| Example 3-9 | 2.4 | 1.5 | 3.5 | 5.5 | 99 | 0 | B | — |
| Reference Example 3-1 | 2.15 | 6.0 | 3.5 | 10.0 | 100 | — | A | low energy density |
| Reference Example 3-2 | 2.15 | 1.5 | 0 | 5.5 | 103 | — | A | poor cycle characteristics |
| Reference Example 3-3 | 2.15 | 1.5 | 7.0 | 5.5 | 93 | — | A | low energy density |

TABLE 8-continued

| | Average oxidation number | Amount of Co in solid solution | Amount of Zn in solid solution | Proportion of all Co | Coefficient of use of actual capacity (%) | Discharge reserve amount (%) | Type of negative electrode alloy | Remarks |
|---|---|---|---|---|---|---|---|---|
| Reference Example 3-4 | 2.15 | 1.5 | 3.5 | 11.0 | 100 | — | A | low energy density |
| Comparative Example 3-1 | 2.0 | 1.5 | 3.5 | 5.5 | 100 | 20 | A | poor cycle characteristics |
| Comparative Example 3-2 | 2.5 | 1.5 | 3.5 | 5.5 | 90 | 0 | B | poor cycle characteristics |

{Evaluation of Examples 3-1 to 3-9, Reference Examples 3-1 to 3-4, and Comparative Examples 3-1 and 3-2}

The batteries of Examples 3-1 to 3-9 each are excellent in the coefficient of use, active-material impregnation amount, and cycle characteristics.

In contrast, as shown in the column "Remarks" in Table 8, the batteries of Reference Example 3-1, in which the amount of Co in solid solution is as large as "6.0% by weight", Reference Example 3-2, in which the amount of Zn in solid solution is as large as "7.0% by weight", and Reference Example 3-4, in which the proportion of all Co is as high as "11.0% by weight", were found to have a low energy density because the positive-electrode materials had a small capacity per unit weight. (It has been ascertained that batteries in which the amount of cobalt in solid solution is "less than 0.5" are apt to suffer oxygen evolution at the positive electrode during charge and hence have a slightly reduced coefficient of use, although such results are not shown in the table.) The battery of Reference Example 3-2, in which the amount of Zn in solid solution is "0% by weight", shows poor cycle performance although high in the coefficient of use. This poor cycle performance is thought to be because γ-NiOOH is apt to generate upon charge/discharge.

Furthermore, a comparison of Example 3-2 and Examples 3-8 (average oxidation number: 2.04) and 3-9 (average oxidation number: 2.4), which are equal to Example 3-2 in "amount of Co in solid solution, amount of Zn in solid solution, and proportion of all Co" but differ from Example 3-2 in "average oxidation number", with Comparative Examples 3-1 (average oxidation number: 2.0) and 3-2 (average oxidation number: 2.5), which are equal to Example 3-2 in "amount of Co in solution, amount of Zn in solution, and proportion of all Co" but differ from Example 3-2 in "average oxidation number", shows the following. In Comparative Example 3-1, the discharge reserve amount increased considerably. It is thought that this increase in discharge reserve amount resulted in a decrease in charge reserve amount accordingly and, hence, in poor cycle characteristics. In Comparative Example 3-2, the positive electrode had too large an average oxidation number and the coefficient of use of actual capacity was as low as "90%". It is thought that the battery capacity in Comparative Example 3-2 was governed by the negative electrode as apparent from these results and that the negative electrode deteriorated considerably upon repetitions of charge/discharge, resulted in poor cycle characteristics.

Example 4

{Production of Nickel Electrodes}

Example 4-1

A nickel electrode was obtained through the following step (1) to step (4).

"Step (1)"

A coating layer comprising β-cobalt hydroxide was formed on the surface of positive active material particles comprising a nickel hydroxide solid solution containing zinc and cobalt incorporated in a solid solution state in amounts of 3 parts by weight and 6 parts by weight, respectively, in terms of the proportions of the metals. Thus, a positive-electrode material was obtained. The proportion of the coating layer comprising β-cobalt hydroxide in the positive-electrode material was regulated to 4% by weight.

"Step (2)"

Eighty parts by weight of the positive-electrode material was mixed with 20 parts by weight of an aqueous carboxymethyl cellulose solution as a binder to prepare a paste.

"Step (3)"

The paste was evenly applied to a porous nickel substrate as a current collector and dried. Thereafter, the porous substrate was pressed and cut into an electrode size for AAA-size batteries. Thus, an electrode body having a capacity of 750 mAh was obtained.

"Step (4)"

The electrode body was immersed in 500 g of 10% by weight aqueous sodium hydroxide solution and subjected to an oxidation treatment with $K_2S_2O_8$ as an oxidizing agent at 50° C. Furthermore, the electrode body was immersed in 500 g of 30% by weight aqueous sodium hydroxide solution and heat-treated at 100° C. The electrode body thus treated was dried in an 80° C. argon atmosphere to obtain a nickel electrode. The $K_2S_2O_8$ was added in an amount of 0.4 g per g of the positive-electrode material. (Although the treated electrode body was dried in an argon atmosphere, the drying in the invention should not be construed as being limited to such drying in an "argon atmosphere".)

Example 4-2

A nickel electrode was obtained in same manner as in Example 4-1, except that the proportion of the coating layer comprising β-cobalt hydroxide in the positive-electrode material was changed to 6% by weight.

Example 4-3

A nickel electrode was obtained in same manner as in Example 4-1, except that the proportion of the coating layer comprising β-cobalt hydroxide in the positive-electrode material was changed to 10% by weight.

Example 4-4

A nickel electrode was obtained in same manner as in Example 4-1, except that the proportion of the coating layer comprising β-cobalt hydroxide in the positive-electrode material was changed to 2% by weight.

Example 4-5

A nickel electrode was obtained in same manner as in Example 4-1, except that the proportion of the coating layer comprising β-cobalt hydroxide in the positive-electrode material was changed to 15% by weight.

Example 4-6

A positive-electrode material was obtained in the same manner as in step (1) in Example 4-1.

Subsequently, the positive-electrode material was mixed with lutetium oxide as a rare-earth compound to obtain mixed particles consisting of particles of the positive-electrode material and the rare-earth compound disposed on the surface of the particles. The proportion of the rare-earth compound in the mixed particles was regulated to 0.5% by weight.

The same procedure as in step (2) to step (4) in Example 4-1 was conducted, except that the mixed particles were used in place of the positive-electrode material. Thus, a nickel electrode was obtained.

Example 4-7

A nickel electrode was obtained in the same manner as in Example 4-6, except that the proportion of the rare-earth compound in the mixed particles was changed to 3.5% by weight.

Example 4-8

A nickel electrode was obtained in the same manner as in Example 3-6, except that the proportion of the rare-earth compound in the mixed particles was changed to 10% by weight.

Example 4-9

A nickel electrode was obtained in the same manner as in Example 4-6, except that the proportion of the rare-earth compound in the mixed particles was changed to 0.1% by weight.

Example 4-10

A nickel electrode was obtained in the same manner as in Example 4-6, except that the proportion of the rare-earth compound in the mixed particles was changed to 15% by weight.

Example 4-11

A nickel electrode was obtained in the same manner as in Example 4-6, except that a rare-earth composite oxide containing 0.5% by weight Er, 1.5% by weight Tm, 85% by weight Yb, and 13% by weight Lu (each based on the sum of the Er, Tm, Yb, and Lu contained in the rare-earth compound) was used as a rare-earth compound, and that the proportion of this rare-earth composite oxide in the mixed particles was regulated to 2% by weight.

Example 4-12

A nickel electrode was obtained in the same manner as in Example 4-6, except that a lutetium compound which, in X-ray diffractometry, had major peaks at $d=0.88\pm0.015$ nm, $d=0.84\pm0.015$ nm, and $d=0.76\pm0.015$ nm was used as a rare-earth compound, and that the proportion of this rare-earth compound in the mixed particles was regulated to 2% by weight.

Example 4-13

A nickel electrode was obtained in the same manner as in Example 4-6, except that a rare-earth composite compound which contained 0.5% by weight Er, 1.5% by weight Tm, 85% by weight Yb, and 13% by weight Lu (each based on the sum of the Er, Tm, Yb, and Lu contained in the rare-earth compound) and which, in X-ray diffractometry, had major peaks at $d=0.88\pm0.015$ nm, $d=0.84\pm0.015$ nm, and $d=0.76\pm0.015$ nm was used as a rare-earth compound, and that the proportion of this rare-earth composite compound in the mixed particles was regulated to 2% by weight.

Example 4-14

An aqueous solution of given amounts of nickel nitrate, cobalt nitrate, zinc nitrate, and

Comparative Example 4-14

An aqueous solution of given amounts of nickel nitrate, cobalt nitrate, zinc nitrate, and lutetium nitrate, an aqueous ammonium sulfate solution, and an aqueous sodium hydroxide solution were added little by little to and mixed with a reaction bath containing ammonium sulfate and sodium hydroxide and regulated so as to have a pH of 12.0±0.2 and a temperature of 45±2° C., while stirring the reaction bath. Throughout this operation, the pH and temperature of the reaction bath were regulated so as to be within those ranges. Thus, positive active material particles were obtained which comprised a nickel hydroxide solid solution containing 1.8% by weight lutetium, which is a rare earth element, and further containing 2.9% by weight zinc and 5.9% by weight cobalt both incorporated in a solid solution state. A cellular substrate made of nickel was impregnated with the positive active material particles.

On the other hand, a given amount of cobalt hydroxide was added to 7 mol/l aqueous potassium hydroxide solution. This solution was allowed to stand at 70° C. overnight to yield cobalt complex ions of a blue color. The cellular nickel substrate impregnated with the positive active material particles was immersed in the solution of cobalt complex ions and charged to a potential of 100 mV versus an Hg/HgO electrode. Thus, a conductive network comprising a high-order cobalt compound was formed among the positive active material particles. Thus, a nickel electrode was obtained.

Comparative Example 4-1

A nickel electrode was obtained through the following step (1) to step (3).

"Step (1)"

A coating layer comprising β-cobalt hydroxide was formed on the surface of positive active material particles comprising a nickel hydroxide solid solution containing zinc and cobalt incorporated in a solid solution state in amounts of 3% by weight and 6% by weight, respectively, in terms of the proportions of the metals. Thus, a positive-electrode material was obtained. The proportion of the coating layer comprising β-cobalt hydroxide in the positive-electrode material was regulated to 6% by weight.

"Step (2)"

Eighty parts by weight of the positive-electrode material was mixed with 20 parts by weight of an aqueous carboxymethyl cellulose solution as a binder to prepare a paste.

"Step (3)"

The paste was evenly applied to a porous nickel substrate as a current collector and dried. Thereafter, the porous substrate was pressed and cut into an electrode size for AAA-size batteries. Thus, an electrode body having a capacity of 750 mAh was obtained as a nickel electrode.

Comparative Example 4-2

A positive-electrode material was obtained in the same manner as in step (1) in Comparative Example 4-1.

Subsequently, the positive-electrode material was mixed with lutetium oxide as a rare-earth compound to obtain mixed particles consisting of particles of the positive-electrode material and the rare-earth compound disposed on the surface of the particles. The proportion of the rare-earth compound in the mixed particles was regulated to 3.5% by weight.

The same procedure as in step (2) and step (3) in Comparative Example 4-1 were conducted, except that the mixed particles were used in place of the positive-electrode material. Thus, a nickel electrode was obtained.

Comparative Example 4-3

A positive-electrode material was obtained in the same manner as in step (1) in Comparative Example 4-1.

Subsequently, the positive-electrode material was treated by the method described in JP-A-2000-223119. Namely, the positive-electrode material was first sprayed with 35% by weight aqueous sodium hydroxide solution in an amount 5 times the amount of the cobalt, while keeping the temperature of the positive-electrode material at 60° C. Thereafter, the positive-electrode material was heated to 90° C. A hundred grams of this positive-electrode material was immersed in an aqueous solution prepared by dissolving 125 ml of 12% by weight sodium hypochlorite in 1,000 ml of 10% by weight aqueous sodium hydroxide solution. The resultant mixture was stirred for 10 minutes.

Using the positive-electrode material which had been thus treated, a nickel electrode was obtained in the same manner as in step (2) and step (3) in Comparative Example 3-1.

Comparative Example 4-4

A positive-electrode material was obtained in the same manner as in step (1) in Comparative Example 4-1. Subsequently, the positive-electrode material was treated in the same manner as in Comparative Example 4-3.

The positive-electrode material which had been treated was then mixed with lutetium oxide as a rare-earth compound to obtain mixed particles consisting of particles of the positive-electrode material and the rare-earth compound disposed on the surface of the particles. The proportion of the rare-earth compound in the mixed particles was regulated to 3.5% by weight.

The same procedure as in step (2) and step (3) in Comparative Example 4-1 was conducted, except that the mixed particles were used in place of the positive-electrode material. Thus, a nickel electrode was obtained.

{Production of Nickel/Metal-Hydride Storage Batteries}

A negative electrode was produced in the following manner. A thickener was added to a powder of a hydrogen-absorbing alloy having the $CaCu_5$ type structure and having a composition represented by $MmNi_{3.5}Co_{0.8}Mn_{0.4}Al_{0.3}$ (wherein Mm means a mischmetal which is a mixture of rare earth elements such as La, Ce, Pr, Nd, and Sm) to prepare a paste. Subsequently, this paste was applied to both sides of a perforated steel plate as a current collector and dried. This perforated steel plate was pressed and cut into an electrode size for AAA-size batteries. Thus, a negative electrode was obtained. The capacity of this negative electrode was regulated to 1.6 times the capacity of the nickel electrode.

The nickel electrode and the negative electrode were wound together with a separator sandwiched therebetween to produce a group of electrodes. This electrode group was placed in a battery case, into which an electrolytic solution was injected. This battery case was sealed to produce a battery. As the separator was used a nonwoven fabric of a polypropylene resin in which acrylic acid had been graft-polymerized. As the battery case was used a cylindrical case. As the electrolytic solution was used a mixture of 6.8 mol/l aqueous potassium hydroxide solution and 0.5 mol/l aqueous lithium hydroxide solution. Thus, a cylindrical, AAA-size, sealed nickel/metal-hydride storage battery having a capacity of 750 mAh was obtained. The electrolytic solution was injected in an amount of 0.9 ml per Ah of the capacity of the positive electrode.

{Evaluation}

The electrode materials constituting the nickel electrodes of Examples 4-1 to 4-13 and Comparative Examples 4-1 to 4-4 and 4-14 were examined for average oxidation number (average oxidation number of the nickel in the positive-electrode material particles and the cobalt in the coating layer), tap density, and powder resistance. The results thereof are shown in Table 9.

TABLE 9

| | Average oxidation number | Tap density (g/cm$^3$) | Powder resistance (Ωcm) |
|---|---|---|---|
| Example 4-1 | 2.25 | 2.2 | 10 |
| Example 4-2 | 2.25 | 2.2 | 4 |
| Example 4-3 | 2.25 | 2.1 | 2 |
| Example 4-4 | 2.25 | 2.3 | 20 |
| Example 4-5 | 2.25 | 2.0 | 1 |
| Example 4-6 | 2.25 | 2.2 | 4 |
| Example 4-7 | 2.25 | 2.2 | 5 |
| Example 4-8 | 2.25 | 2.3 | 20 |
| Example 4-9 | 2.25 | 2.2 | 4 |
| Example 4-10 | 2.25 | 2.3 | 40 |
| Example 4-11 | 2.25 | 2.2 | 5 |
| Example 4-12 | 2.25 | 2.2 | 5 |

TABLE 9-continued

|  | Average oxidation number | Tap density (g/cm³) | Powder resistance (Ωcm) |
|---|---|---|---|
| Example 4-13 | 2.25 | 2.2 | 5 |
| Comparative Example 4-14 | 2.25 | 2.2 | 5 |
| Comparative Example 4-1 | 2.0 | 2.2 | >10⁶ |
| Comparative Example 4-2 | 2.0 | 2.2 | >10⁶ |
| Comparative Example 4-3 | 2.3 | 1.9 | 100 |
| Comparative Example 4-4 | 2.3 | 1.9 | 120 |

(Production of Open Type Test Cells)

Each of the nickel electrodes of Examples 4-1 to 4-13 and Comparative Examples 4-1 to 4-4 and 4-14 was superposed on a negative electrode which had undergone a sufficient activation treatment beforehand, through a separator comprising a nonwoven fabric formed from polyolefin resin fibers. An even pressure was applied to this assembly to produce an open type test cell containing an electrolytic solution in an excess amount.

(Measurement of Discharge Capacity)

At 20° C., the open type test cell was charged at a charge current of 0.1 ItA for 15 hours, paused for 1 hour, and then discharged at 0.2 ItA to a final voltage of 0 V based on Hg/HgO as a reference electrode. This charge/discharge cycle was repeatedly conducted 10 times to determine the discharge capacity in this operation. In the 11th cycle, the cell was discharged at 5 ItA, and the discharge capacity in this discharge was determined. The results are shown in Table 10.

TABLE 10

| Nickel electrode | Coefficient of use of positive electrode after 10 cycles (%) | Coefficient of use of positive electrode in 5-ItA discharge (%) |
|---|---|---|
| Example 4-1 | 103 | 78 |
| Example 4-2 | 102 | 81 |
| Example 4-3 | 101 | 82 |
| Example 4-4 | 96 | 72 |
| Example 4-5 | 101 | 81 |
| Example 4-6 | 101 | 81 |
| Example 4-7 | 103 | 79 |
| Example 4-8 | 101 | 76 |
| Example 4-9 | 103 | 81 |
| Example 4-10 | 101 | 65 |
| Example 4-11 | 103 | 78 |
| Example 4-12 | 101 | 81 |
| Example 4-13 | 102 | 81 |
| Comparative Example 4-14 | 102 | 80 |
| Comparative Example 4-3 | 95 | 65 |
| Comparative Example 4-4 | 94 | 63 |

The coefficient of use of positive electrode shown in Table 10 means the proportion of the capacity obtained in 0.2-ItA discharge to the theoretical capacity calculated on the assumption that the nickel hydroxide has undergone a one-electron reaction. As can be seen from Table 10, the batteries employing the nickel electrodes of the Examples can attain a preferred discharge capacity as compared with the batteries employing the nickel electrodes of the Comparative Examples. A comparison between Example 4-1 and Example 4-4 shows that Example 4-1 attains a higher coefficient of use of the positive electrode. A comparison between Example 4-3 and Example 4-5 shows that Example 4-3 attains a slightly higher coefficient of use of the positive electrode. Consequently, the proportion of the coating layer comprising β-cobalt hydroxide is preferably from 4 to 10% by weight.

(Determination of Charge Efficiency at High Temperature)

At 20° C., the open type test cell was charged at a charge current of 0.1 ItA for 15 hours, paused for 1 hour, and then discharged at 0.2 ItA to a final voltage of 0 V based on the Hg/HgO as a reference electrode. This charge/discharge cycle was repeatedly conducted 10 times. In the 11th cycle, the battery was discharged at 5 ItA to examined the discharge capacity in this discharge. Thereafter, at 50° C., the battery was charged at a charge current of 0.1 ItA for 15 hours, paused for 1 hour, and then discharged at 0.2 ItA to a final voltage of 0 V based on Hg/HgO as a reference electrode. This charge/discharge cycle at 50° C. was repeated until the discharge capacity became stable. The results are shown in Table 11.

TABLE 11

| Nickel electrode | Efficiency of charge at 50° C., 0.2 ItA (%) |
|---|---|
| Example 4-2 | 67 |
| Example 4-6 | 74 |
| Example 4-7 | 90 |
| Example 4-8 | 91 |
| Example 4-9 | 66 |
| Example 4-10 | 90 |
| Example 4-11 | 89 |
| Example 4-12 | 91 |
| Example 4-13 | 90 |
| Comparative Example 4-14 | 90 |
| Comparative Example 4-1 | 65 |
| Comparative Example 4-3 | 51 |
| Comparative Example 4-4 | 62 |

The charge efficiency shown in Table 11 means the proportion of the capacity obtained in 0.2-ItA discharge at 50° C. to the theoretical capacity calculated on the assumption that the nickel hydroxide has undergone a one-electron reaction. As can be seen from Table 11, the batteries employing the nickel electrodes of the Examples can attain a preferred charge efficiency at the high temperature as compared with the batteries employing the nickel electrodes of the Comparative Examples. A comparison between Example 4-6 and Example 4-9 shows that Example 4-6 attains a higher charge efficiency. A comparison between Example 4-8 and Example 4-10 shows that Example 4-8 attains a slightly higher charge efficiency. Consequently, the proportion of the compound containing one or more rare earth elements is preferably from 0.5 to 10% by weight.

(Determination of Discharge Recovery after Over Discharge)

The discharge recovery was determined through the following steps (1) to (3).

(1): At 20° C., the nickel/metal-hydride storage battery was charged at a charge current of 0.1 ItA for 15 hours, paused for 1 hour, and then discharged at a discharge current of 0.2 ItA to a final voltage of 1.0 V.

(2): Ten cycles of this charge/discharge operation were repeatedly conducted, and the battery in the discharge termination state was connected to a 4-Ω resistor at 60° C. for 3 days.

(3): Thereafter, the battery was subjected again at 20° C. to 15-hour discharge at a discharge current of 0.1 ItA, 1-hour pause, and then discharge at a discharge current of 0.2 ItA to a final voltage of 1.0 V. The recovered discharge capacity was measured.

The results are shown in Table 12.

(Determination of Discharge Recovery after Standing)

The discharge recovery was determined through the following steps (1) to (3).

(1) The same procedure as in "(1) in Determination of Discharge Recovery after Over Discharge" was conducted.

(2) Ten cycles of this charge/discharge operation were repeatedly conducted, and the battery in the discharge termination state was allowed to stand at 60° C. for 30 days.

(3) The same procedure as in "(3) in Determination of Discharge Recovery after Over Discharge" was conducted.

The results are shown in Table 12.

TABLE 12

| Nickel electrode | Discharge recovery after over discharge (%) | Discharge recovery after standing (%) |
| --- | --- | --- |
| Example 4-2 | 97 | 99 |
| Example 4-7 | 99 | 100 |
| Example 4-11 | 99 | 99 |
| Example 4-12 | 100 | 100 |
| Example 4-13 | 99 | 100 |
| Comparative Example 4-14 | 96 | 97 |
| Comparative Example 4-1 | 85 | 89 |
| Comparative Example 4-2 | 86 | 91 |

The discharge recovery after over discharge shown in Table 12 means the proportion of the capacity obtained in 0.2-ItA discharge at 20° C. after over discharge to the theoretical battery capacity calculated on the assumption that the nickel hydroxide has undergone a one-electron reaction. The discharge recovery after standing shown in Table 12 means the proportion of the capacity obtained in 0.2-ItA discharge at 20° C. to the theoretical battery capacity calculated on the assumption that the nickel hydroxide has undergone a one-electron reaction.

As can be seen from Table 12, the batteries employing the nickel electrodes of the Examples are satisfactory in discharge recovery after over discharge and discharge recovery after standing.

Example 5

Example 5-1

{Production of Nickel Electrode Material}

A positive-electrode material produced in the same manner as in "Production of Positive Active Material" and "Production of Positive-Electrode Material (Coating with Cobalt Hydroxide)" in Example 1-1 was subjected to the following oxidation treatment and heat treatment to obtain a nickel electrode material.

"Oxidation Treatment: First Step"

While 100 g of the positive-electrode material particles were kept being stirred in 400 g of 10% by weight aqueous sodium hydroxide solution, 45 ml of a sodium hypochlorite solution (manufactured by Wako Pure Chemical Industries, Ltd.) was added thereto. The reaction temperature and reaction period were 60° C. and 3 hours, respectively. After completion of the reaction, the positive-electrode material particles were taken out of the reaction bath, washed with water, recovered by filtration, and dried. In the positive-electrode material obtained, the average oxidation number of nickel and cobalt was 2.15.

"Heat Treatment: Second Step"

To the positive-electrode material particles which had undergone the oxidation treatment were added 20 g of 30% by weight aqueous sodium hydroxide solution and 3.5 g of $Yb_2O_3$. This mixture was heat-treated at 120° C. for 2 hours with stirring. After completion of the reaction, the positive-electrode material particles were taken out of the reaction bath, filtered, washed with water, and dried. In the positive-electrode material obtained, the average oxidation number of nickel and cobalt was 2.15. This positive-electrode material obtained is referred to as the nickel electrode material of Example 4-1.

{Production of Nickel Electrode}

The nickel electrode material obtained was mixed with 0.6% by weight carboxymethyl cellulose solution and 60% by weight polytetrafluoroethylene solution in a ratio of 76.7:22.9:0.4 by weight to prepare an electrode material paste. A porous cellular nickel substrate was impregnated with the electrode material paste, subsequently dried, and then rolled to produce a nickel electrode having an electrode material impregnation density of 2.6 g/ml and a positive-electrode capacity of 1,450 mAh (theoretical capacity of the nickel hydroxide was regarded as 289 mAh/g).

{Production of Alkaline Storage Battery}

An alkaline storage battery was produced by the same method as in Example 1. Namely, the nickel electrode and a negative electrode comprising as the main material a hydrogen-absorbing alloy represented by the composite formula $Mn_{1.0}Ni_{4.0}Co_{0.7}Mn_{0.3}Al_{0.3}$ were spirally wound through a nonwoven polypropylene fabric having a thickness of 100 μm and inserted into a battery case. Thereafter, an electrolytic solution comprising an aqueous potassium hydroxide solution and an aqueous lithium hydroxide solution was injected into the battery case, which was then sealed. Thus, an AA-size nickel/metal-hydride storage battery having a theoretical capacity of 1,450 mAh was produced. This is referred to as the battery of Example 5-1.

Examples 5-2 to 5-5

Nickel electrode materials of Examples 5-2 to 5-5 were produced in the same manner as in Example 5-1, except that each of $Er_2O_3$, $Lu_2O_3$, $Tm_2O_3$, and $Y_2O_3$ was used in place of $Yb_2O_3$ in the heat treatment (second step) in Example 5-1. In each of the nickel electrode materials obtained, the average oxidation number of nickel and cobalt was 2.15.

Using the nickel electrode materials of Examples 5-2 to 5-5, AA-size nickel/metal-hydride storage batteries having a theoretical capacity of 1,450 mAh were further produced in the same manner as in Example 5-1. These are referred to as the batteries of Examples 5-2 to 5-5.

Example 5-6

A nickel electrode material of Example 5-6 was produced in the same manner as in Example 5-1, except that 3.5 g of $Yb_2O_3$ also was added to the aqueous sodium hydroxide solution in the oxidation treatment (first step) in Example 5-1, and that the addition of $Yb_2O_3$ in the heat treatment step in Example 5-1 was omitted. In the nickel electrode material obtained, the average oxidation number of nickel and cobalt was 2.15.

Using the nickel electrode material of Example 5-6, an AA-size nickel/metal-hydride storage battery having a theoretical capacity of 1,450 mAh was further produced in the same manner as in Example 5-1. This is referred to as the battery of Example 5-6.

Comparative Example 5-1

A positive-electrode material was obtained in the same manner as in Example 5-1. The subsequent oxidation treatment and heat treatment were omitted. The positive-electrode material obtained is referred to as the nickel electrode material of Comparative Example 5-1. In this nickel electrode material, the average oxidation number of nickel and cobalt was 2.00.

Using the nickel electrode material of Comparative Example 5-1, an AA-size nickel/metal-hydride storage battery having a theoretical capacity of 1,450 mAh was further produced in the same manner as in Example 5-1. This is referred to as the battery of Comparative Example 5-1.

Comparative Example 5-2

The nickel electrode material of Comparative Example 5-2 is the same as that of Comparative Example 5-1. Subsequently, the nickel electrode material of Comparative Example 5-2, $Yb_2O_3$, 0.6% by weight carboxymethyl cellulose solution, and 60% by weight polytetrafluoroethylene solution were mixed together in a ratio of 74.7:2.6:22.3:0.4 by weight to prepare an electrode material paste. This electrode material paste was used to produce a nickel electrode and a nickel/metal-hydride storage battery in the same manner as in Example 5-1. This battery is referred to as the battery of Comparative Example 5-2.

Reference Example 5-11

A nickel electrode material of Reference Example 5-1 was produced in the same manner as in Example 5-1, except that the addition of $Yb_2O_3$ in the heat treatment step in Example 5-1 was omitted. In the nickel electrode material obtained, the average oxidation number of nickel and cobalt was 2.15.

Using the nickel electrode material of Reference Example 5-1, an AA-size nickel/metal-hydride storage battery having a theoretical capacity of 1,450 mAh was further produced in the same manner as in Example 5-1. This is referred to as the battery of Reference Example 5-1.

Reference Example 5-2

The nickel electrode material of Reference Example 5-2 is the same as that of Reference Example 5-1. The nickel electrode material of Reference Example 5-2 was used to produce an electrode material paste, a nickel electrode, and a nickel/metal-hydride storage battery in the same manner as in Comparative Example 5-2. This battery is referred to as the battery of Reference Example 5-2.

Treatment conditions in Examples 5-1 to 5-6, Comparative Examples 5-1 and 5-2, and Reference Examples 5-1 and 5-2 are shown in Table 13.

TABLE 13

| | First step (oxidation treatment) | | | | Second Step (heat treatment) | | | | Paste preparation step |
|---|---|---|---|---|---|---|---|---|---|
| | Aqueous NaOH solution (wt %) | Temperature (° C.) | Hours | Additive | Aqueous NaOH solution (wt %) | Temperature (° C.) | Hours | Additive | Additive |
| Example 5-1 | 10 | 60 | 3 | — | 30 | 120 | 2 | $Yb_2O_3$ | — |
| Example 5-2 | 10 | 60 | 3 | — | 30 | 120 | 2 | $Er_2O_3$ | — |
| Example 5-3 | 10 | 60 | 3 | — | 30 | 120 | 2 | $Lu_2O_3$ | — |
| Example 5-4 | 10 | 60 | 3 | — | 30 | 120 | 2 | $Tm_2O_3$ | — |
| Example 5-5 | 10 | 60 | 3 | — | 30 | 120 | 2 | $Y_2O_3$ | — |
| Example 5-6 | 10 | 60 | 3 | $Yb_2O_3$ | 30 | 120 | 2 | — | — |
| Comparative Example 5-1 | — | — | — | — | — | — | — | — | — |
| Comparative Example 5-2 | — | — | — | — | — | — | — | — | $Yb_2O_3$ |
| Reference Example 5-1 | 10 | 60 | 3 | — | 30 | 120 | 2 | — | — |
| Reference Example 5-2 | 10 | 60 | 3 | — | 30 | 120 | 2 | — | $Yb_2O_3$ |

{Evaluation}

The electrode materials constituting the nickel electrodes of Examples 5-1 to 5-6, Comparative Examples 5-1 and 5-2, and Reference Examples 5-1 and 5-2 were examined for tap density and powder resistance. The results thereof are shown in Table 14. In Table 14, values of average oxidation number (average oxidation number of the nickel in the positive-electrode material particles and the cobalt in the coating layer) are shown.

TABLE 14

| | Average oxidation number | Tap density (g/cm$^3$) | Powder resistance (Ωcm) |
|---|---|---|---|
| Example 5-1 | 2.15 | 2.2 | 8 |
| Example 5-2 | 2.15 | 2.2 | 8 |
| Example 5-3 | 2.15 | 2.2 | 8 |
| Example 5-4 | 2.15 | 2.2 | 8 |
| Example 5-5 | 2.15 | 2.2 | 8 |
| Example 5-6 | 2.15 | 2.2 | 8 |
| Comparative Example 5-1 | 2.00 | 2.2 | >1000 |

TABLE 14-continued

|  | Average oxidation number | Tap density (g/cm³) | Powder resistance (Ωcm) |
|---|---|---|---|
| Comparative Example 5-2 | 2.00 | 2.2 | >1000 |
| Reference Example 5-1 | 2.15 | 2.2 | 8 |
| Reference Example 5-2 | 2.15 | 2.2 | 8 |

{Evaluation of Battery Characteristics}

All samples of or arbitrarily selected samples of each of the batteries of Examples 5-1 to 5-6, Comparative Examples 5-1 and 5-2, and Reference Examples 5-1 and 5-2 were examined for the following properties (1) to (5).

(1) Coefficient of Use of Actual Capacity

The coefficient of use of actual capacity was determined by the same method as that described under "Coefficient of Use of Actual Capacity" in Example 1. The results thereof are shown in Table 15. The coefficients of use shown in Table 15 are values determined after several repetitions of charge and discharge.

(2) Coefficient of Use in High-Temperature Charge

In a 60° C. atmosphere, each battery for which the coefficient of use of actual capacity had been determined was charged at a charge current of 145 mA (0.1 ItA) for 15 hours and then discharged at 290 mA (0.2 ItA). The discharge was terminated when the battery voltage reached 1.0 V. The discharge capacity in this operation was determined. From this discharge capacity and the theoretical capacity of the battery, the coefficient of use in high-temperature charge was determined using the following equation. The results thereof are shown in Table 15.

(Coefficient of use in high-temperature charge)=(discharge capacity in 0.2-ItA discharge)÷1,450×100

(3) Coefficient of Use in High-Rate Discharge

The coefficient of use in high-rate discharge was determined by the same method as that described under "Coefficient of Use in High-Rate Discharge" in Example 1. The results thereof are shown in Table 15.

(4) Coefficient of Use After High-Temperature Standing

Figure 7:
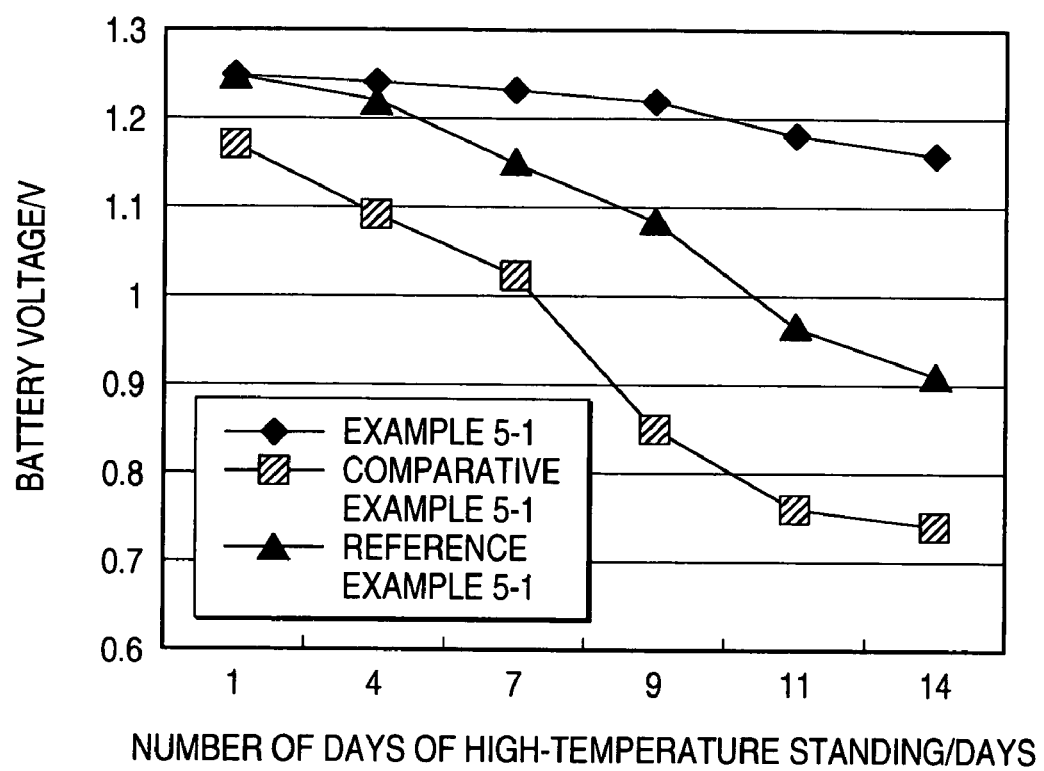
FIG. 7 is a presentation showing "battery voltage changes in high-temperature standing" of batteries obtained in Example 5.

Each battery which had been examined for the coefficient of use of actual capacity was allowed to stand, in the discharge termination state, in an 80° C. atmosphere for 14 days. Thereafter, in a 20° C. atmosphere, the battery was charged at a charge current of 145 mA (0.1 ItA) for 15 hours and then discharged at 290 mA (0.2 ItA). The discharge was terminated when the battery voltage reached 1.0 V. The discharge capacity in this operation was determined. From this discharge capacity and the theoretical capacity of the battery, the coefficient of use after high-temperature standing was determined using the following equation. The results thereof are shown in Table 15. FIG. 7 shows changes in battery voltage during high-temperature standing.

(Coefficient of use after high-temperature standing)= (discharge capacity in 0.2-ItA discharge)÷1,450× 100

(5) Internal Pressure During High-Rate Charge

A sensor for internal-pressure measurement was attached to the battery, and the internal pressure during charge at a charge current of 1,450 mA (1 ItA) was measured. The results thereof are shown in Table 15. The internal pressures shown in Table 15 are values obtained after 1.5-hour charge.

TABLE 15

| | Coefficient of Use | | | | Internal pressure |
|---|---|---|---|---|---|
| | Actual capacity (%) | In high-temperature charge (%) | In high-rate discharge (%) | After high-temperature standing (%) | in high-rate charge (MPa) |
| Example 5-1 | 100 | 80 | 90 | 100 | 0.3 |
| Example 5-2 | 100 | 76 | 90 | 100 | 0.3 |
| Example 5-3 | 100 | 79 | 90 | 100 | 0.3 |
| Example 5-4 | 100 | 78 | 90 | 100 | 0.3 |
| Example 5-5 | 100 | 72 | 90 | 100 | 0.3 |
| Example 5-6 | 100 | 79 | 89 | 100 | 0.3 |
| Comparative Example 5-1 | 100 | 42 | 90 | 80 | 0.7 |
| Comparative Example 5-2 | 100 | 78 | 80 | 85 | 0.7 |
| Reference Example 5-1 | 100 | 53 | 90 | 95 | 0.3 |
| Reference Example 5-2 | 100 | 79 | 85 | 100 | 0.3 |

(Evaluation)

The coefficients of use in high-temperature charge for Examples 5-1 to 5-6, Comparative Example 5-2, and Reference Example 5-2 are higher than those for Comparative Example 5-1 and Reference Example 5-1. The reason for this is thought to be as follows. In Examples 5-1 to 5-6, Comparative Example 5-2, and Reference Example 5-2, the rare-earth compounds added serve to shift the oxygen evolution potential during charge to the nobler side and, hence, oxygen evolution is inhibited and nickel oxidation is enhanced.

The coefficients of use in high-rate discharge for Examples 5-1 to 5-6 are higher than those for Comparative Example 5-2 and Reference Example 5-2. The reason for this is thought to be as follows. In Examples 5-1 to 5-6, since the rare-earth compounds have been heat-treated, the rare-earth compounds have improved stability in the alkaline electrolytic solution and, hence, are inhibited from reacting with the electrolytic solution or dissolving in the electrolytic solution. Consequently, the inhibition of cobalt ion dissolution or cobalt hydroxide precipitation in the electrolytic solution by the rare-earth compounds is prevented. Furthermore, the rare-earth compounds are prevented from depositing on the negative electrode to enhance the resistance of the negative electrode.

The coefficient of use after high-temperature standing for Example 5-1 is higher than those for Comparative Example 5-1 and Reference Example 5-1. The reasons for this are thought to be as follows.

(i) In Example 5-1, oxygen evolution at the positive electrode during high-temperature standing is inhibited by the rare-earth compound added and, hence, the positive electrode is inhibited from undergoing the self-discharge caused by oxygen evolution. Consequently, the decrease in positive-electrode voltage due to self-discharge is inhibited.

Furthermore, in Example 5-1, since the cobalt in the coating layer and the nickel in the positive active material have been oxidized by the oxidation treatment, the generation of an irreversible electric capacity by the first charge after battery fabrication is prevented in an amount corresponding to the oxidation, whereby a sufficient reduction in discharge reserve is attained. Because of the discharge reserve reduction, hydrogen evolution at the negative electrode during high-temperature standing is inhibited and the positive electrode is inhibited from undergoing the self-discharge caused by hydrogen. Consequently, the decrease in positive-electrode voltage due to self-discharge is inhibited.

Incidentally, in case where a decrease in positive-electrode voltage occurs, the high-order cobalt compound constituting a conductive network comes to be exposed to a reducing atmosphere. As a result, the resistance of the network increases and the coefficient of use of the positive active material decreases.

However, in Example 5-1, the positive-electrode voltage is inhibited from decreasing and is hence kept at a potential at which the high-order cobalt compound constituting a conductive network is stably present. Consequently, the coefficient of use after high-temperature standing is improved.

(ii) In Comparative Example 5-1, since no oxidation treatment has been conducted, the positive electrode during high-temperature standing undergoes self-discharge due to the hydrogen evolved at the negative electrode, resulting in a decrease in battery voltage.

(iii) In Reference Example 5-1, since no rare-earth compound has been added, the positive electrode is apt to undergo self-discharge due to oxygen evolution and the battery voltage hence tends to decrease.

The internal pressures for Examples 5-1 to 5-6 are lower than that for Comparative Example 5-2. The reason for this is thought to be as follows. In Examples 5-1 to 5-6, since the cobalt in the coating layer and the nickel in the positive active material have been oxidized by the oxidation treatment, the generation of an irreversible electric capacity by the first charge after battery fabrication is prevented in an amount corresponding to the oxidation. Consequently, a sufficient reduction in discharge reserve is attained and hydrogen evolution at the negative electrode is inhibited.

INDUSTRIAL APPLICABILITY (Nickel Electrode Material According to the Invention)

According to the invention described in claim 1, a sufficient reduction in discharge reserve can be attained, and a higher electrode material density and hence a higher capacity can be attained.

According to the invention described in claim 2, the conductivity of the positive active material and the electrode capacity can be made satisfactory.

According to the invention described in claim 3, a coefficient of active-material use of nearly 100% is obtained and a high tap density of the active material is maintained.

According to the invention described in claim 4, the high-order cobalt compound is not destroyed and retains a conductive network, even through over discharge or long-term standing at a high temperature. The nickel electrode material hence shows satisfactory properties concerning the restoration of discharge after over discharge or long-term standing. In addition, high conductivity is obtained without fail.

According to the invention described in claim 5, a sufficient electric double-layer capacity can be obtained.

According to the invention described in claim 6, a nickel electrode material comprising a positive-electrode material which can attain a reduction in discharge reserve, has high conductivity, and attains a high active-material impregnation density is obtained.

According to the inventions described in claims 7 to 9, a nickel electrode having an enlarged difference between the oxygen evolution potential and the oxidation potential can be realized and, hence, the charge efficiency can be further improved.

(Process for Nickel Electrode Material Production According to the Invention)

According to the invention described in claim 10, the "nickel electrode materials" which are the inventions described in claims 1 to 9 can be obtained.

According to the invention described in claim 11, the "nickel electrode material" which is the invention described in claim 3 can be obtained.

(Nickel Electrode According to the Invention)

According to the inventions described in claims 12 to 14, the quantity of electricity corresponding to the irreversible oxidation reactions of nickel hydroxide and cobalt hydroxide is diminished. Furthermore, the irreversible reactions of nickel hydroxide and cobalt hydroxide are inhibited. In addition, a "nickel electrode" having a coefficient of active-material use of nearly 100% and having a large active-material impregnation amount can be obtained.

(Alkaline Storage Battery According to the Invention)

According to the invention described in claim 15, the alkaline storage battery has a high capacity because of the high tap density. Furthermore, since a reduction in discharge reserve is attained, the battery has excellent internal-pressure characteristics and improved cycle life characteristics.

According to the invention described in claim 16, the conductivity of the positive active material and the electrode capacity are satisfactory.

According to the invention described in claim 17, a coefficient of active-material use of nearly 100% is obtained and a high tap density of the active material is maintained.

According to the invention described in claim 18, a conductive network is maintained and satisfactory properties concerning restoration of discharge are obtained. In addition, high conductivity is obtained without fail.

According to the invention described in claim 19, a sufficient electric double-layer capacity can be obtained.

According to the inventions described in claims 20 and 21, the coefficient of use and impregnation density of the active material can be heightened and, hence, the battery can have a high capacity. Furthermore, since this alkaline storage battery has a reduced discharge reserve amount, it can have satisfactory cycle life characteristics.

According to the inventions described in claims 21 and 22, the difference between the oxygen evolution potential and the oxidation potential in the nickel electrode is increased and, hence, the charge efficiency can be further improved.

The invention claimed is:

1. A nickel electrode material for use in a nickel electrode, comprising:
    a positive-electrode material comprising:
        positive active material particles which comprise as the main component at least one member selected from a group consisting of a nickel hydroxide, and a solid solution in a nickel hydroxide of one or more other elements and in which part of the nickel hydroxide has been oxidized; and
        a coating layer formed on a surface of the positive active material particles and comprising as a main component a high-order cobalt compound in which cobalt has an oxidation number greater than 2,
    wherein an average oxidation number of nickel in the positive active material particles and the cobalt in the coating layer is from 2.04 to 2.40, wherein the positive-electrode material has a tap density of 2.0 g/cm³ or greater, and wherein the high-order cobalt compound is capable of being electrochemically oxidized and reduced, has an electric double-layer capacity, and has a peak for a (003) plane with a half width of 0.7 degrees or greater in an X-ray diffraction pattern.

2. The nickel electrode material of claim 1, wherein the proportion of the coating layer in the positive-electrode material is from 3 to 10% by weight.

3. The nickel electrode material of claim 1, wherein the nickel hydroxide in the positive active material particles is one in which, in an X-ray diffraction pattern, the peak intensity ratio between a (100) plane and (001) plane, (100)/(001), and the peak intensity ratio between a (101) plane and (001) plane, (101)/(001), each are 0.5 or greater and the half width of the peak for the (101) plane is greater than 0.8 degrees and not greater than 1.2 degrees.

4. The nickel electrode material of claim 1, wherein the high-order cobalt compound has a specific surface area of 4 m²/g or greater in terms of BET area.

5. The nickel electrode material of claim 1, wherein the positive-electrode material comprises:

positive active material particles comprising a solid solution in a nickel hydroxide of both cobalt and zinc; and a coating layer formed on the surface of the active material particles and comprising as the main component a high-order cobalt compound in which the cobalt has an oxidation number greater than 2, wherein the average oxidation number of the nickel in the positive active material particles and the cobalt in the coating layer is from 2.04 to 2.40, and wherein the amounts of the cobalt and zinc in said solid solution in the positive active material are from 0.5 to 4% by weight and from 1 to 5% by weight, respectively, in terms of the proportion of the metal, and the proportion of all cobalt in the positive-electrode material, including the cobalt in solution in the positive active material and the cobalt in the coating layer, is from 3 to 10% by weight in terms of the proportion of the metal.

6. The nickel electrode material of claim 1, wherein the positive active material particles comprise a compound containing one or more rare earth elements, and wherein the compound containing one or more rare earth elements comprises an oxide or hydroxide including at least one of Yb, Er, Lu, Tm, and Y.

7. The nickel electrode material of claim 6, wherein the positive-electrode material has, disposed on the surface thereof, said compound containing one or more rare earth elements.

8. A nickel electrode comprising:
a porous substrate impregnated with the nickel electrode material of claim 1.

9. An alkaline storage battery having a nickel electrode, said nickel electrode comprising:

a positive-electrode material comprising:

positive active material particles which comprise as the main component at least one member selected from a group consisting of a nickel hydroxide, and a solid solution in a nickel hydroxide of one or more other elements and in which part of the nickel hydroxide has been oxidized; and a coating layer formed on a surface of the positive active material particles and comprising as a main component a high-order cobalt compound in which cobalt has an oxidation number greater than 2, wherein an average oxidation number of nickel in the positive active material particles and the cobalt in the coating layer is from 2.04 to 2.40, wherein the positive-electrode material has a tap density of 2.0 g/cm³ or greater, and wherein the high-order cobalt compound is capable of being electrochemically oxidized and reduced, has an electric double-layer capacity, and has a peak for a (003) plane with a half width of 0.7 degrees or greater in an X-ray diffraction pattern.

10. A nickel electrode comprising:
a porous substrate impregnated with the nickel electrode material of claim 2.

11. A nickel electrode comprising:
a porous substrate impregnated with the nickel electrode material of claim 3.

12. A nickel electrode comprising:
a porous substrate impregnated with the nickel electrode material of claim 4.

13. A nickel electrode comprising:
a porous substrate impregnated with the nickel electrode material of claim 5.

14. A nickel electrode comprising:
a porous substrate impregnated with the nickel electrode material of claim 6.

15. A nickel electrode comprising:
a porous substrate impregnated with the nickel electrode material of claim 7.

16. The alkaline storage battery of claim 9, wherein the proportion of the coating layer in the positive-electrode material is from 3 to 10% by weight.

17. The alkaline storage battery of claim 9, wherein the nickel hydroxide in the positive active material particles comprises one in which, in an X-ray diffraction pattern, the peak intensity ratio between a (100) plane and (001) plane, (100)/(001), and the peak intensity ratio between a (101) plane and (001) plane, (101)/(001), each are 0.5 or greater and the half width of the peak for the (101) plane is greater than 0.8 degrees and not greater than 1.2 degrees.

18. The alkaline storage battery of claim 9, wherein the high-order cobalt compound comprises a specific surface area of 4 m²/g or greater in terms of BET area.

19. The alkaline storage battery of claim 9, wherein the positive-electrode material comprises:

positive active material particles comprising a solid solution in a nickel hydroxide of both cobalt and zinc; and a coating layer formed on the surface of the active material particles and comprising as the main component a high-order cobalt compound in which the cobalt has an oxidation number greater than 2, wherein the average oxidation number of the nickel in the positive active material particles and the cobalt in the coating layer is from 2.04 to 2.40, and wherein the amounts of the cobalt and zinc contained in solid solution in the positive active material are from 0.5 to 4% by weight and from 1 to 5% by weight, respectively, in terms of the proportion of the metal, and the proportion of all cobalt in the positive-electrode material, including the cobalt contained in solution in the positive active material and the cobalt contained in the coating layer, is from 3 to 10% by weight in terms of the proportion of the metal.

20. The alkaline storage battery of claim 9, wherein the positive active material particles comprise a compound containing one or more rare earth elements, and wherein the compound containing one or more rare earth elements comprises an oxide or hydroxide including at least one of Yb, Er, Lu, Tm, and Y.

21. The alkaline storage battery of claim 20, wherein the positive-electrode material has, disposed on the surface thereof, said compound containing one or more rare earth elements.

22. The nickel electrode material of claim 6, wherein a proportion of the compound containing one or more rare earth elements in the nickel electrode material is in a range from 0.1% to 20% by weight.

23. The nickel electrode material of claim 1, wherein the nickel hydroxide in the positive active material particles is one in which, in an X-ray diffraction pattern, the peak intensity ratio between a (100) plane and (001) plane, (100)/(001), and the peak intensity ratio between a (101) plane and (001) plane, (101)/(001), each are 0.5 or greater and the half width of the peak for the (101) plane is greater than 0.9 degrees and not greater than 1.2 degrees.

* * * * *